(12) United States Patent
Sadeh et al.

(10) Patent No.: US 8,888,110 B2
(45) Date of Patent: Nov. 18, 2014

(54) PALLET DOLLY

(75) Inventors: Dagan Sadeh, Raanana (IL); Haron Hacko, Kfar Kama (IL); Nir Hadar, Shafayim (IL)

(73) Assignee: Polymer Logistics (Israel) Ltd., Raanana (IL)

( * ) Notice: Subject to any disclaimer, the term of this patent is extended or adjusted under 35 U.S.C. 154(b) by 300 days.

(21) Appl. No.: 13/296,267

(22) Filed: Nov. 15, 2011

(65) Prior Publication Data

US 2013/0119623 A1    May 16, 2013

(51) Int. Cl.
| | | |
|---|---|---|
| B62D 61/12 | (2006.01) | |
| B62B 3/02 | (2006.01) | |
| B62B 5/04 | (2006.01) | |
| B62B 5/00 | (2006.01) | |
| B65D 19/42 | (2006.01) | |
| B65D 19/00 | (2006.01) | |

(52) U.S. Cl.
CPC ......... *B62B 3/02* (2013.01); *B65D 2519/00129* (2013.01); *B65D 2519/00333* (2013.01); *B62B 5/0433* (2013.01); *B65D 2519/00412* (2013.01); *B65D 2519/00791* (2013.01); *B65F 2519/00567* (2013.01); *B65D 2519/00323* (2013.01); *B65D 2519/00273* (2013.01); *B62B 5/049* (2013.01); *B65D 2519/00437* (2013.01); *B65D 2519/00024* (2013.01); *B62B 5/0093* (2013.01); *B65D 2519/00139* (2013.01); *B65D 19/42* (2013.01); *B65D 2519/0084* (2013.01); *B65D 19/0026* (2013.01); *B65D 2519/00029* (2013.01); *B65D 2519/00034* (2013.01); *B65D 2519/00069* (2013.01); *B65D 2519/000572* (2013.01); *B65D 2519/000293* (2013.01); *B65D 2519/00288* (2013.01); *B65D 2519/00781* (2013.01)

USPC ..................... 280/43.14; 280/30; 280/43.12

(58) Field of Classification Search
USPC ........ 280/6.15, 6.151, 43.13, 33.995, 33.997, 280/33.998, 79.11, 43, 43.12, 43.14, 30
See application file for complete search history.

(56) References Cited

U.S. PATENT DOCUMENTS

| | | | |
|---|---|---|---|
| 1,129,775 A | | 2/1915 | Anthony |
| 2,360,874 A | * | 10/1944 | Herold .............................. 188/5 |
| 2,843,392 A | * | 7/1958 | Simpkins ................... 280/43.14 |
| 3,216,531 A | | 11/1965 | Hutchinson |
| 3,422,929 A | * | 1/1969 | Oja et al. .......................... 188/5 |
| 3,710,895 A | | 1/1973 | Freedman |
| 4,016,819 A | | 4/1977 | Cowling |

(Continued)

FOREIGN PATENT DOCUMENTS

| | | |
|---|---|---|
| DE | 2032214 | 2/1972 |
| DE | 2364909 | 7/1975 |

(Continued)

*Primary Examiner* — J. Allen Shriver, II
*Assistant Examiner* — Emma K Frick
(74) *Attorney, Agent, or Firm* — Mark M. Friedman

(57) ABSTRACT

A pallet-dolly device convertible between a pallet and a dolly has a generally rectangular deck to which a set of dolly wheels are attached at a fixed height below the deck. A set of movable pallet skids are moved by a skid displacement mechanism between a skid lowered position in which a ground contacting surface of the skid is lowered below a contact plane of the wheels to provide a pallet state of the pallet-dolly device, and a skid raised position in which the skid ground contacting surface is raised above the wheel contact plane to provide a dolly state of the pallet-dolly device. At least two pedals, accessible from two adjacent sides of the deck, are deployed to be operated by a user to activate the skid displacement mechanism.

13 Claims, 15 Drawing Sheets

(56) References Cited

U.S. PATENT DOCUMENTS

| | | | | |
|---|---|---|---|---|
| 4,073,369 | A | 2/1978 | Nordskog | |
| 4,213,624 | A | 7/1980 | Sanders | |
| 4,313,612 | A | 2/1982 | Rubens | |
| 4,471,969 | A | 9/1984 | Zabala | |
| 4,753,419 | A | 6/1988 | Johansson | |
| 4,886,286 | A | 12/1989 | Whorton | |
| 5,113,960 | A | 5/1992 | Prinz | |
| 5,193,828 | A | 3/1993 | Benvenuti | |
| 5,514,118 | A | 5/1996 | Kummer et al. | |
| 5,551,715 | A | 9/1996 | Pickard | |
| 5,584,639 | A | 12/1996 | Walker, Jr. | |
| 5,752,584 | A | 5/1998 | Magoto et al. | |
| 5,819,671 | A | 10/1998 | Ocampo | |
| 5,829,947 | A | 11/1998 | Litten | |
| 5,845,914 | A | 12/1998 | Lenkman | |
| 5,890,562 | A | 4/1999 | Bartels et al. | |
| 5,938,217 | A | 8/1999 | Wintz | |
| 6,016,580 | A * | 1/2000 | Heimbrock et al. | 5/86.1 |
| 6,264,006 | B1 * | 7/2001 | Hanson et al. | 188/1.12 |
| 6,390,759 | B1 | 5/2002 | Novak et al. | |
| 6,450,515 | B1 | 9/2002 | Guth | |
| 6,860,496 | B2 | 3/2005 | Novak et al. | |
| 7,165,776 | B2 | 1/2007 | Quinlan et al. | |
| 7,537,222 | B2 | 5/2009 | Hadar | |
| 7,810,822 | B2 * | 10/2010 | Figel et al. | 280/47.38 |
| 8,006,985 | B2 * | 8/2011 | Facey et al. | 280/43.14 |
| 8,292,309 | B2 * | 10/2012 | Fan et al. | 280/43.14 |
| 8,403,344 | B2 * | 3/2013 | Carver et al. | 280/79.11 |
| 8,511,693 | B2 * | 8/2013 | Gass et al. | 280/43.17 |
| 2003/0213878 | A1 | 11/2003 | Stahl | |
| 2005/0002766 | A1 | 1/2005 | Hartmann | |
| 2007/0186827 | A1 * | 8/2007 | Loftus et al. | 108/57.15 |
| 2009/0236809 | A1 * | 9/2009 | Carver et al. | 280/43.12 |
| 2010/0187782 | A1 * | 7/2010 | Facey et al. | 280/30 |
| 2012/0024329 | A1 * | 2/2012 | Ma | 135/16 |
| 2013/0119624 | A1 * | 5/2013 | Stubbs | 280/30 |
| 2013/0121800 | A1 * | 5/2013 | Hacko et al. | 414/800 |

FOREIGN PATENT DOCUMENTS

| | | |
|---|---|---|
| DE | 2432111 | 1/1976 |
| DE | 7526812 | 1/1976 |
| DE | 19809331 | 5/1999 |
| EP | 0487147 | 5/1992 |
| EP | 0666209 | 8/1995 |
| EP | 1176079 | 1/2002 |
| EP | 1362794 | 11/2003 |
| EP | 1524170 | 4/2005 |
| EP | 2103491 | 9/2009 |
| FR | 1391000 | 1/1965 |
| GB | 1232144 | 5/1971 |
| GB | 1498022 | 1/1978 |
| JP | 2000238777 | 9/2000 |
| WO | 2004080780 | 9/2004 |
| WO | 2005080214 | 9/2005 |
| WO | 2007028194 | 3/2007 |
| ZA | 8902552 | 12/1989 |

* cited by examiner

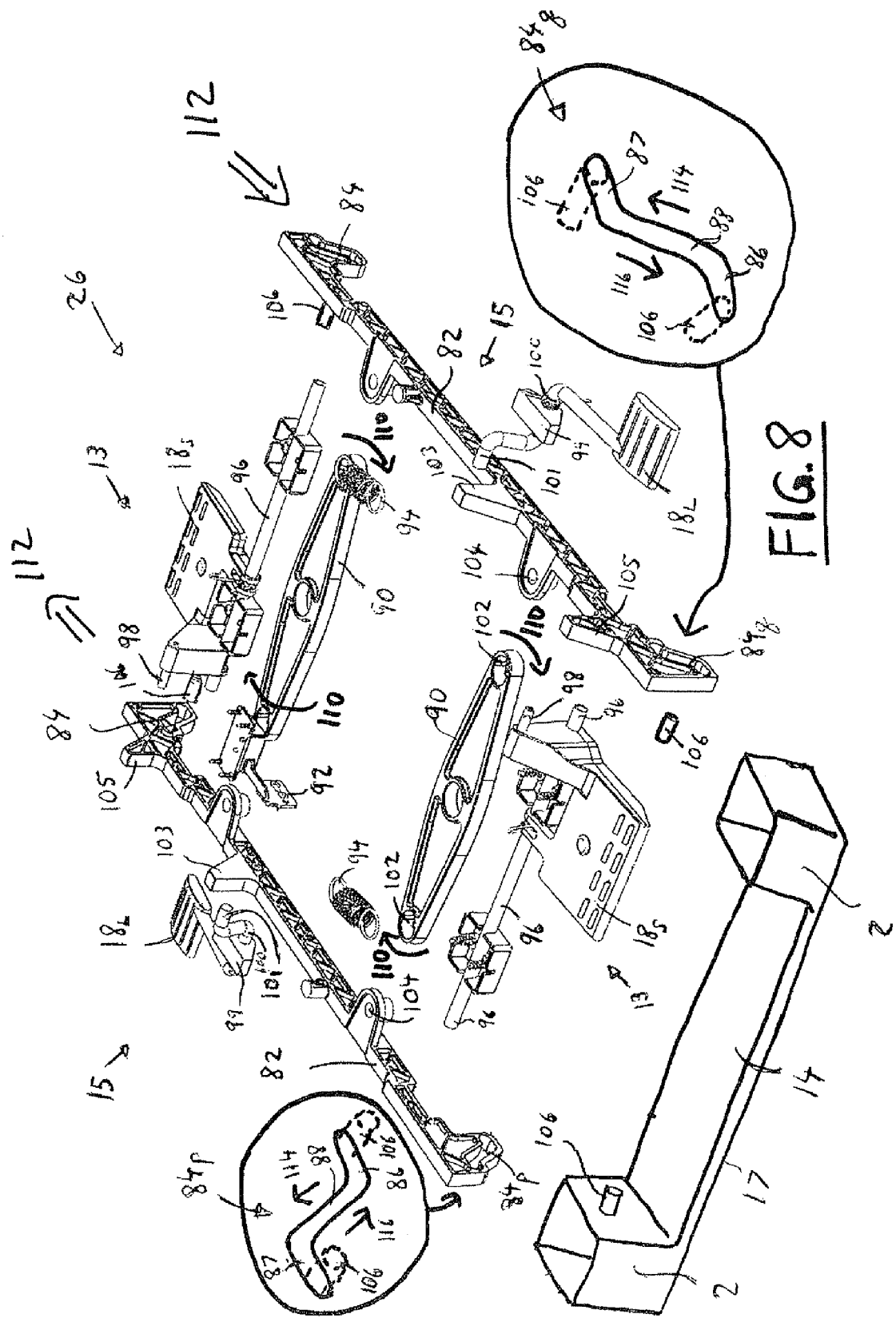

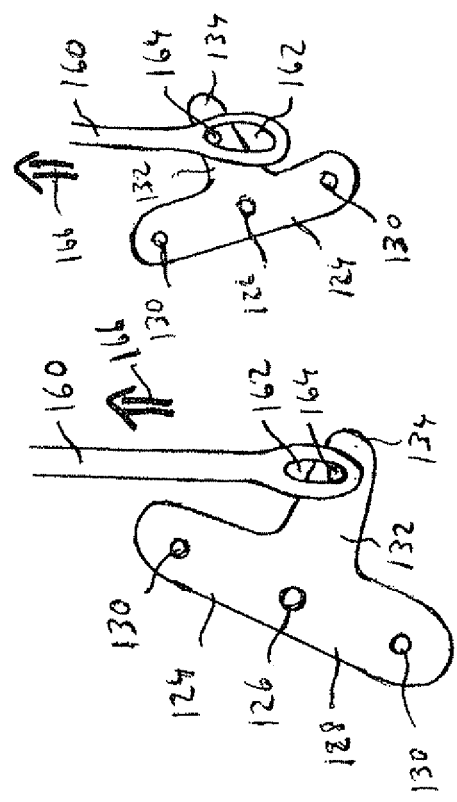

PALLET DOLLY

BACKGROUND

1. Technical Field

Embodiments of the present invention relate generally to moving equipment and, more particularly, but not exclusively, to a movable platform in that can be configured as a pallet or a dolly.

2. Description of Related Art

Pallets and dollies are in extensive use worldwide to facilitate the movement of goods. Both pallets and dollies may be described as low to the ground, portable platforms on which goods may be stacked for storage or moving. The two devices are distinguished primarily by their type of undersurface or ground contact. Pallets have a fixed, non-rolling bottom surface, whereas dollies have wheels, with or without brakes.

A common type of pallet bottom surface is a skid, which is a continuous plank that provides support along its whole length. Pallets generally also include open ends configured to receive the forks of a manual pallet jack, motorized forklift truck, or other lifting device, so that the palletized load can be raised and moved about easily.

Pallets are particularly suitable for storing goods, such as at a warehouse, moving goods on conveyor belts and roll conveyors, and for transporting goods between distant locations, where the pallets are loaded onto shipping containers, trucks, railway cars, and other vehicles. Dollies are better suited for the internal movement of goods within a given location where pallet moving equipment such as manual pallet jacks or forklift trucks would be unwieldy or costly. For example, unloading a shipment of goods at a supermarket is often more efficiently accomplished by having the stocking clerk wheel a dolly holding the goods to the appropriate display section of the store, rather than through use of a forklift.

In order to achieve efficient shipping and distribution of goods, it is often desirable to transfer the goods from one device to another, and in particular from a pallet to a dolly. However, physically removing goods from one movable platform and re-loading them on another is inefficient and time consuming. As a result, attempts have been made to create movable platforms that can function as both pallets and dollies, where the user can switch the platform functionality as needed. As a pallet, the undersurface would be one or more skids, and as a dolly, the undersurface would be wheels. An example of such a combination device is U.S. Pat. No. 7,537,222 to Hadar. This patent shows a device in which dolly wheels are placed at a fixed height relative to the load bearing deck, and various displacement mechanisms are used to extend or retract pallet skids as appropriate.

BRIEF SUMMARY

According to an aspect of the present invention, there is provided a pallet-dolly device convertible between a pallet and a dolly, the device comprising:

a deck having a generally rectangular shape with four sides, and a load supporting surface;

a set of dolly wheels, attached at a fixed height below an underside of the deck so as to define a wheel contact plane;

a set of movable pallet skids, each pallet skid having a ground contacting surface;

a skid displacement mechanism, mechanically linked to the deck and the pallet skids, configured to move the pallet skids between a skid lowered position in which the skid ground contacting surface is lowered below the wheel contact plane to provide a pallet state of the pallet-dolly device, and a skid raised position in which the skid ground contacting surface is raised above the wheel contact plane to provide a dolly state of the pallet-dolly device; and at least two pedals associated with the skid displacement mechanism and deployed to be operated by a user to activate the skid displacement mechanism, a first of the pedals being accessible from a first side of the deck and a second of the pedals being accessible from a second side of the deck adjacent to the first side of the deck.

BRIEF DESCRIPTION OF THE DRAWINGS

The present invention will be further understood and appreciated from the following detailed description taken in conjunction with the drawings in which:

FIG. 8 is an exploded view of a skid displacement mechanism of the pallet-dolly of FIGS. 6A, 6B, and 7;

FIG. 14A is a schematic illustration of a side pedal rod and cross connector of the pallet-dolly of FIG. 13A; and FIG. 14B is a schematic illustration of a side pedal rod and cross connector of the pallet-dolly of FIG. 13B.

DETAILED DESCRIPTION

Figure 1A:
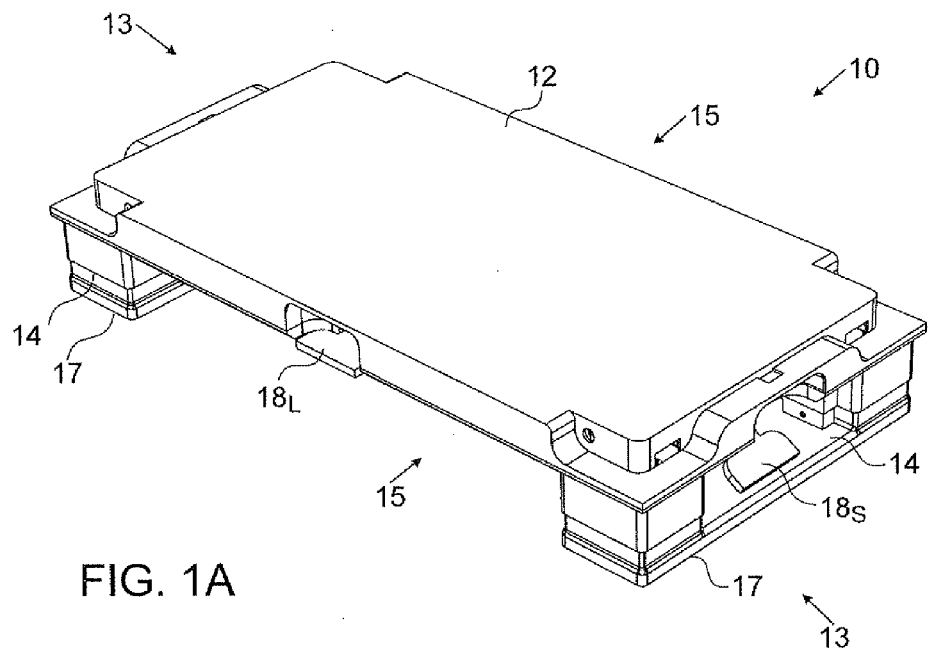
FIG. 1A is a perspective view of a pallet-dolly consistent with an embodiment of the present invention, where the pallet-dolly is configured as a pallet.

Reference will now be made in detail to embodiment(s) of the present invention, examples of which are illustrated in the accompanying drawings, wherein like reference numerals refer to the like elements throughout. The embodiment(s) is/are described below to explain the present invention by referring to the figures.

Figure 1B:
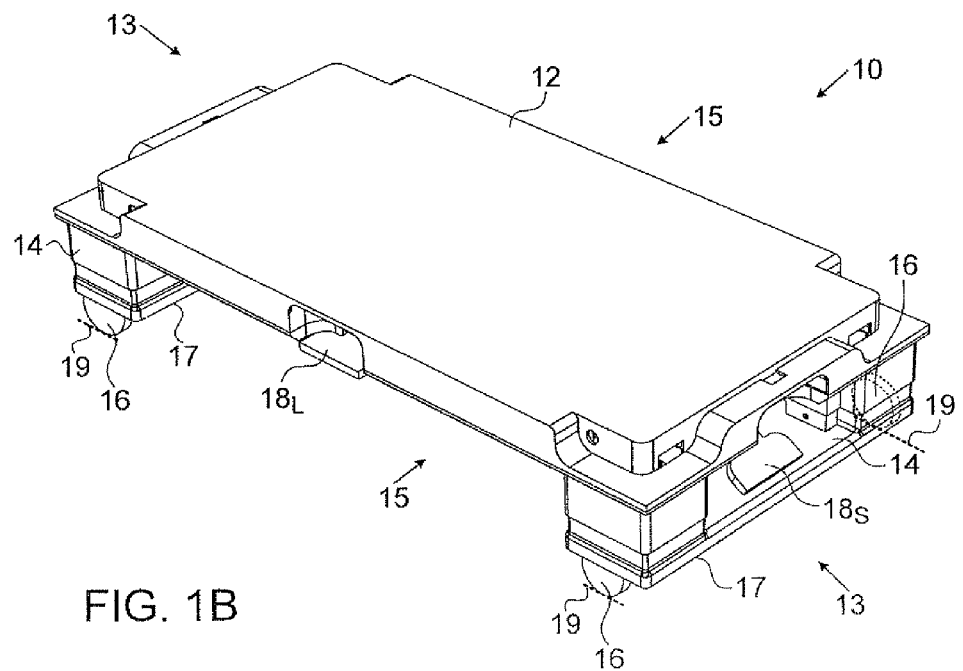
FIG. 1B is a perspective view of the pallet-dolly of FIG. 1A, where the pallet-dolly is configured as a dolly.

Referring now to FIGS. 1A and 1B, there is shown a perspective view of a pallet-dolly 10 consistent with an embodiment of the present invention. Pallet-dolly 10 is a movable platform or device used to carry a load, such as goods in commerce, for shipping or storage. As indicated, pallet-dolly 10 includes a deck 12 to support the load, a set of skids 14, and a set of wheels 16. Skids 14 include a bottom or ground contacting surface or edge 17. As indicated, pallet-dolly 10 is generally rectangular, having two short sides 13 and two long sides 15.

Pallet-dolly 10 further includes at least two user conversion activators, shown as pedals 18. Further, it is a feature of the present invention that the two pedals 18 are located on adjacent sides of pallet-dolly 10, as shown in the figure. For convenient reference, the pedal positioned on short side 13 of pallet-dolly 10 is designated $18_S$, and the other pedal positioned on long side 15 of pallet-dolly 10 is designated $18_L$.

Pallet-dolly 10 is configured to be convertible between a pallet and a dolly at the discretion of a user. FIG. 1A shows device 10 configured as a pallet, in which a bottom surface of the device is the set of skids 14, or more particularly, skid bottom edge 17. FIG. 1B shows device 10 configured as a dolly, in which the bottom surface is the set of wheels 16. When configured as a pallet, pallet-dolly 10 generally requires pallet handling equipment such as a manual or motorized forklift to be moved by a user. When configured as a dolly, wheels 16 enable a user to move pallet-dolly 10, in most cases, simply by manually pushing or pulling on a part of pallet-dolly 10 or on the load supported by deck 12, or by use of a removable handle (not shown) configured for engaging corresponding features of the pallet-dolly.

Conversion between the two states is effected by the user activating any one of the user conversion activators or pedals 18. For example, if pallet-dolly 10 is configured as a pallet as in FIG. 1A, and the user places a foot on any pedal 18 and presses down, pallet-dolly 10 will change to the dolly configuration of FIG. 1B. Similarly, if in this state the user again presses down on any pedal 18 (or in some cases a separate pedal or directly on the skid), device 10 will change back to the pallet configuration of FIG. 1A, or in some cases, to a braking state just prior to reaching the final pallet configuration. It is to be appreciated that this convertibility function of pallet-dolly 10 is operable whether pallet dolly 10 is empty, as shown in FIGS. 1A-B, or carrying a load on deck 12.

As will be discussed in greater detail below, skids 14 are movable between a lowered position and a raised position. In FIG. 1A skids 14 are in the lowered position. In this position skid bottom edges 17 are below or lower than a wheel contact plane 19 defined by the bottoms of wheels 16, so that skids 14 make contact with the ground and device 10 is configured as a pallet. In FIG. 1B skids 14 are in the raised position, in which skid bottom edges 17 are above wheel contact plane 19. Accordingly in this case wheels 16 contact the ground, and device 10 is configured as a dolly.

As noted, pedals 18 are provided on two adjacent sides of pallet-dolly 10. An advantage of this configuration is that when a group of pallet-dollies 10 are stored while in the pallet state, the devices 10 can be arranged so that at least one side having a pedal is accessible to a user. In this way, the user has the flexibility to convert the stored pallets into dollies if desired, and continue movement of the goods in a more convenient state.

Figure 2A:
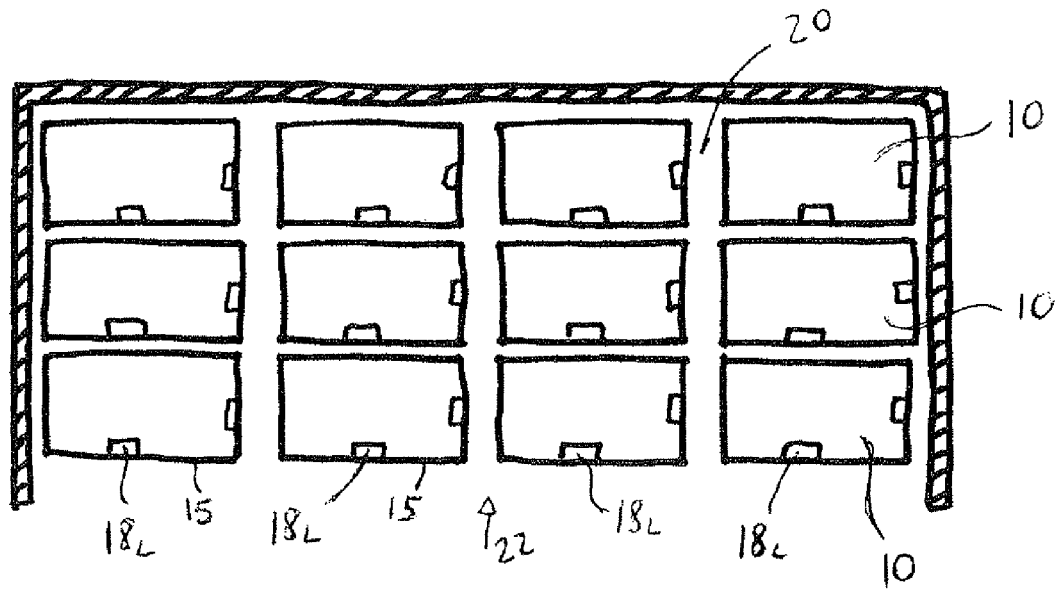
FIG. 2A is a schematic view of a plurality of pallet-dolly devices consistent with an embodiment of the present invention arranged in a storage or shipping space, where the devices are accessible from a long side of the device.
Figure 2B:
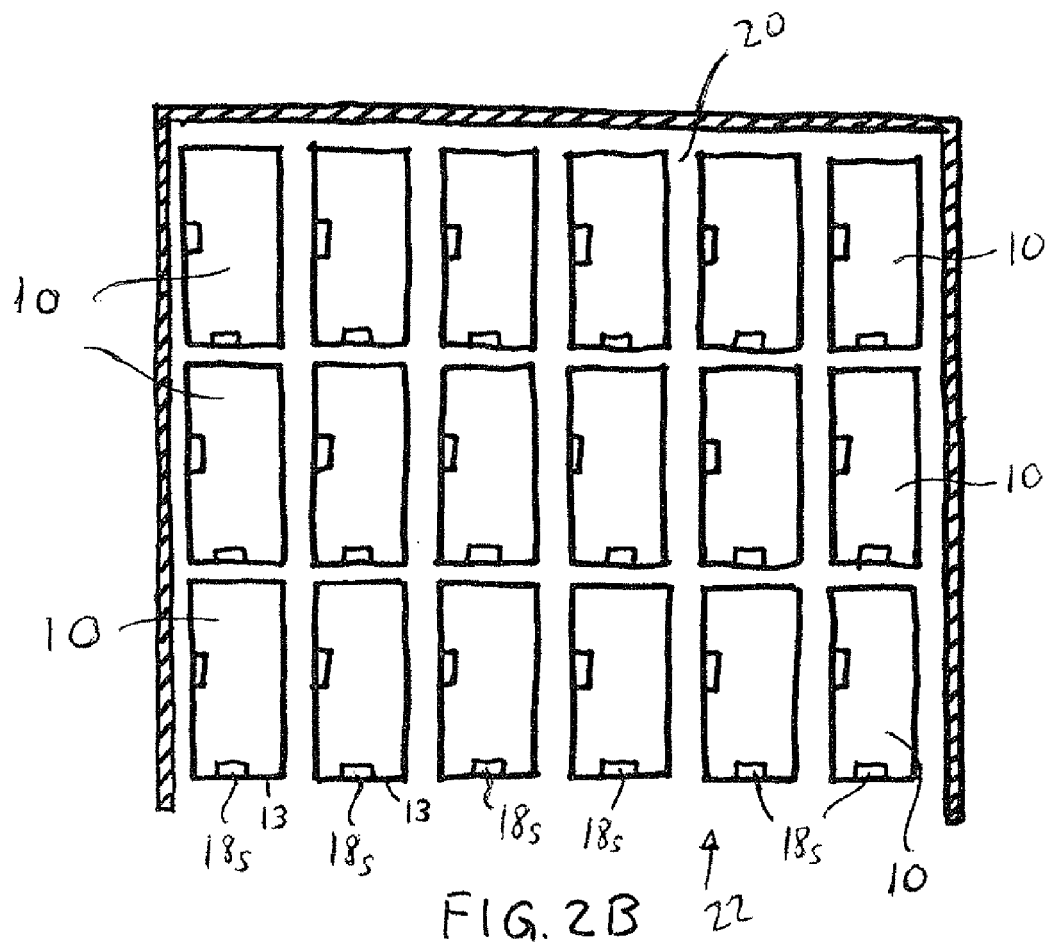
FIG. 2B is a schematic view of a plurality of pallet-dolly devices consistent with an embodiment of the present invention arranged in a storage or shipping space, where the devices are accessible from a short side of the device.

FIGS. 2A and 2B provide examples of how goods transported on pallet-dollies 10 of the present invention, according to some embodiments, may be conveniently stored. As indicated the goods are stored in a storage area or space 20 that is closed on three sides and has one open side or opening 22. The goods are loaded on pallet-dollies 10 configured as pallets, and moved into position by a forklift or similar type of equipment.

An example of the type of storage represented by FIGS. 2A-B is packing a truck or shipping container at a warehouse or factory, using a forklift, for shipment to a receiver that does not have a forklift or similar equipment. It is to be appreciated that truck cargo holds and shipping containers are typically enclosed on three sides and have one entry or open side. Another example is storing goods on pallets at the back of a store in a room or other enclosed area, using a forklift, where it is inconvenient or inappropriate to use a forklift when moving the goods to the display area at the front of the store.

As shown by the two figures, the plurality of pallet-dollies 10 may be arranged by the user in whichever orientation is most convenient or efficient, while retaining accessibility to a pedal and the option of converting the devices to dollies at the time of removal from storage area 20. For example, in FIG. 2A the pallet-dollies 10 are efficiently stored so that long side 15 of each device 10 faces open side 22 of space 20. Accordingly, devices 10 will be convertible at the time of removal as long as the devices are stored so that the long side having pedal 18, or pedal $18_L$, as shown in FIGS. 1A-B, faces opening 22. Similarly, in FIG. 2B, devices 10 are stored in space 20 so that short side 13 faces opening 22, and are convertible at the time of removal as long as the devices are stored so that the short side having pedal 18, or pedal $18_S$, as shown in FIGS. 1A-B, faces opening 22.

According to some embodiments of the invention, pedals 18 may be provided on any three or four sides of pallet dolly 10. In a preferred embodiment of the invention, pedals 18 are provided on all four sides. An advantage of having pedals on more than two adjacent sides is that greater flexibility is available when storing pallet-dollies 10. More particularly, in the preferred embodiment of pallet-dolly 10 where at least one pedal 18 is provided on each side of the device, the plurality of pallet-dollies 10 may be stored in spaces 20 of FIGS. 2A-B without concern about whether an appropriate side is facing opening 22, since each side would have at least one pedal 18.

Deck 12 has an overall shape that is generally rectangular, having two short sides 13 and two long sides 15. According to some embodiments deck 12 may be square, with four sides of equal length. The sides are substantially straight and uninterrupted, but may include rounded corners, localized recesses, or other breaks or discontinuities from a straight line, as shown in the device of FIGS. 1A and 1B. Deck 12 is preferably made of strong plastic, but may be made from any other material that is rigid and sufficiently strong to support the type of load to be carried by pallet-dolly 10, such as metal or wood, for example. The underside of deck 12 which comes in contact with the forks of a forklift also usually includes a layer of rubber or rubber strips, so that pallet-dolly 10 does not slip off the forklift while being lifted.

Skids 14 are functionally continuous planks that provide support along their length, so that they can be moved on a roller conveyor or the like. As shown in greater detail below, skids 14 also include wheel openings 28 to accommodate wheels 16.

The set of skids 14 generally comprises two skids at opposing ends of pallet-dolly 10. Skids 14 are preferably located at the ends of pallet-dolly 10 corresponding to short sides 13, and accordingly have a length that is substantially the same as short sides 13. According to some embodiments of the invention, skids 14 may alternatively be located at opposing long sides 15, and have a length substantially the same as long sides 15. In the example of FIGS. 1A-B, skids 14 are located at short sides 13.

Skids 14 may be made from any material that is durable and strong, and are most conveniently made of the same material used for deck 12. The underside of skids 14, which comes in contact with an underlying surface such as a floor, is also typically covered in a layer of rubber or rubber strips.

The set of wheels 16 generally comprises four wheels, one at each corner of device 10. According to some embodiments, set of wheels 16 may comprise four groups of wheels, where each group consists of two or more wheels placed at each corner of the device. Embodiments of this type may be useful to support loads that are particularly heavy. Wheels 16 may be fixed in orientation so that they can only roll in one direction, such as along a line parallel to long sides 15. Alternatively, wheels 16 may be configured to swivel or rotate, usually over a full 360 degree range. Wheels that swivel provide greater maneuverability, but also swerve more are more difficult to control and move in a straight line. For this reason, some embodiments of device 10 combine the two wheel types, using a pair of fixed orientation wheels at one end and a pair of swivel wheels at the other end.

Pedals 18 are elements of device 10 that are accessible to a user and function as a user interface. As discussed in greater detail below, pedals 18 are operatively connected to an internal skid displacement mechanism that moves skids 14 between the lowered position and the raised position. Accordingly, the user activates one of the pedals 18 whenever the user wishes to convert device 10 from a pallet to a dolly, or from a dolly to a pallet.

Pedals 18 may have any form or configuration that is convenient for access and use by a user, and that provides an efficient connection to the skid displacement mechanism. The pedals 18 should not require more than a moderate degree of force to operate, so that device 10 can be used by users of relatively small size or strength. At the same time, the degree of force required should not be too light, as that might cause a conversion to occur inadvertently upon incidental contact with the actuator.

According to some embodiments, a hand activated device such as a manual lever or handle may be used instead of pedal 18. Such a lever could also function as an external handle for moving device 10 when configured as a dolly. Foot activated pedals however are generally preferred in that they can be easily activated by a standing user, unlike some types of manually operated levers which may require the user to bend down.

In some preferred embodiments, pedals 18 are configured so that the same motion or action by the user achieves both conversions, i.e. from pallet to dolly and from dolly to pallet. This has the advantage of simplifying operation in the field. In other embodiments, a different pedal motion, or direct depression of a skid, may be used to actuate one of the conversions.

As noted, two user conversion activators or pedals 18 are shown in FIGS. 1A-B. Each pedal 18 is sized, shaped, and positioned so that it is accessible to a user of pallet dolly 10 from a particular side of the device, and so that the pedal is able to be activated by the user in a convenient manner such as being depressed by the user's foot. As noted, in FIGS. 1A-B pedal $18_S$ is accessible to a user positioned at, near, or adjacent to short side 13, and pedal $18_L$ is accessible to a user positioned at, near, or adjacent to long side 15. The two pedals are typically substantially the same size and shape, but can be designed to differ from one another in size and/or shape if desired.

Pallet-dolly devices may be configured to have skids positioned at a fixed height relative to the deck, and wheels that are attached to a displacement mechanism that is movable between an extended position, in which the wheels are lowered, and a contracted position, in which the wheels are raised. In this way, raising the wheels moves them closer to the deck so the device is a pallet, and lowering the wheels moves them further from the deck, below the skids, so the device is a dolly. This may be referred to as a "fixed skid" type, or alternatively, "movable wheel" type of pallet-dolly.

In industrial practice, as noted above, goods are often shipped on pallets, following which it is desired to move the goods on a wheeled dolly for unloading. In the fixed skid type of pallet-dolly, conversion from a pallet to a dolly involves extending the displacement mechanism, to lower the wheels. However, this means that extension will occur while the pallet-dolly is loaded. It is to be appreciated that loads may be heavy, for example, several hundreds of pounds or even over a ton or 500 kg. The displacement mechanism for the fixed skid pallet-dolly accordingly needs to be relatively strong and robust mechanically, in order to overcome the force of the load when extending the wheels, and also to hold the wheels in place while supporting the load.

In another type of pallet-dolly device, the wheels are positioned at a fixed height relative to the deck and the skids are attached to the displacement mechanism. In this "fixed wheel" or "movable skid" configuration, the displacement mechanism extends to lower the skids when in pallet configuration, and the displacement mechanism contracts to raise the skids to convert from a pallet to a dolly. It is to be appreciated that the contraction function of the displacement mechanism, when performed under a load, is assisted by the downward force of the load rather than opposed by it, as is the case with the fixed skid type of pallet-dolly described above.

As a result, the displacement mechanism required for the fixed wheel type may be relatively simpler and less powerful than for the fixed skid type, as it does not need to generate as large a force. Further, the displacement mechanism in this case is not subject to the same degree of stress and pressure experienced from repeated use, and is therefore likely to operate for a relatively longer period of time without breakdown. Accordingly, since the displacement mechanism is a relatively complex component of the pallet-dolly, the fixed wheel type of pallet-dolly is preferred.

Figure 3:
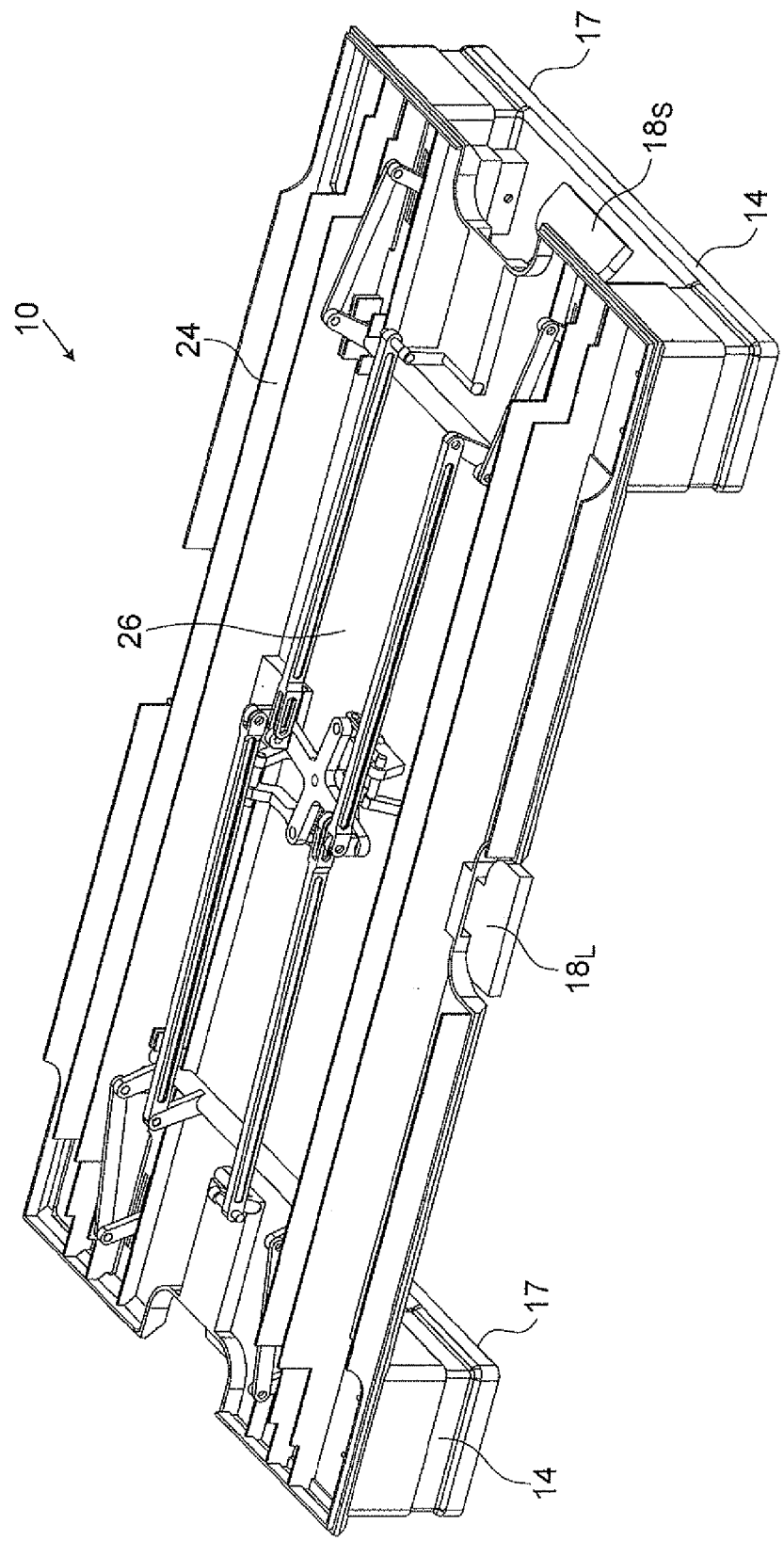
FIG. 3 is a perspective view of the pallet-dolly of FIG. 1A with the deck removed so that underlying reinforcing beams and a skid displacement mechanism are visible.

FIG. 3 shows pallet-dolly 10 of FIG. 1 with deck 12 removed, to reveal internal components of device 10. As indicated, there is a set of reinforcing beams 24 and a skid displacement mechanism 26. The set of wheels 16 are held and supported by a corresponding set of wheel frames, not shown in the figure.

Reinforcing beams 24 attach in a fixed manner to an underside of deck 12. Skid displacement mechanism 26 and the wheel frames in turn are fixedly attached to an underside of reinforcing beams 24. The set of skids 14 attach to skid displacement mechanism 26, as described in greater detail below.

Reinforcing beams 24 are an optional element, provided in some embodiments to increase the rigidity and strength of pallet-dolly 10, so that the device is better able to support heavy loads. Reinforcing beams 24 can also serve as a strong anchor point for attachment of wheels 16 and skids 14 through skid displacement mechanism 26. The beams may be made of plastic, such as the same plastic frequently used for deck 12, but may also be made from other materials that provide strength and rigidity, such as metal.

Figure 4:
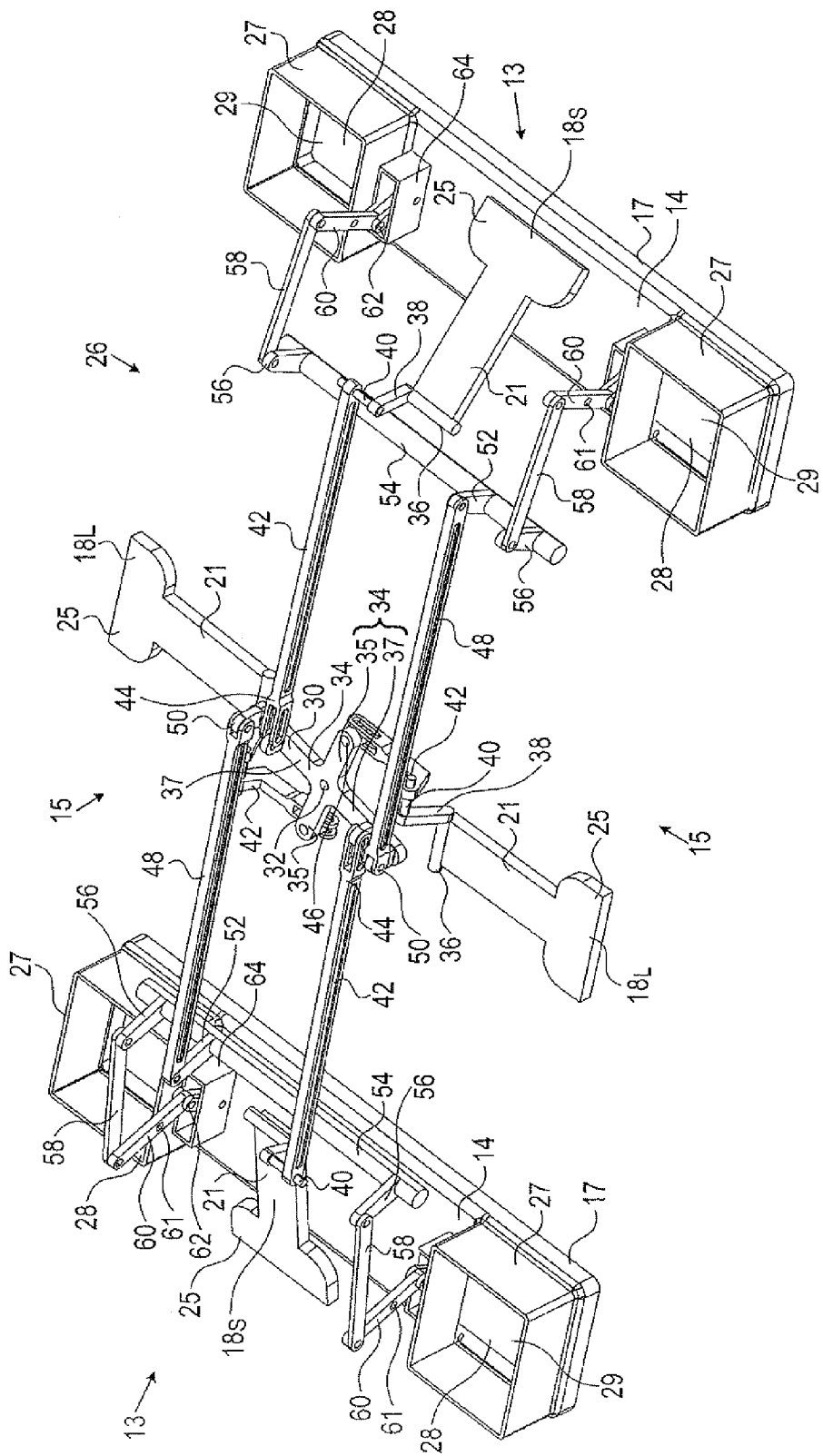
FIG. 4 is a perspective view of the skid displacement mechanism of the pallet-dolly of FIGS. 1A, 1B, and 3.
Figure 5A:
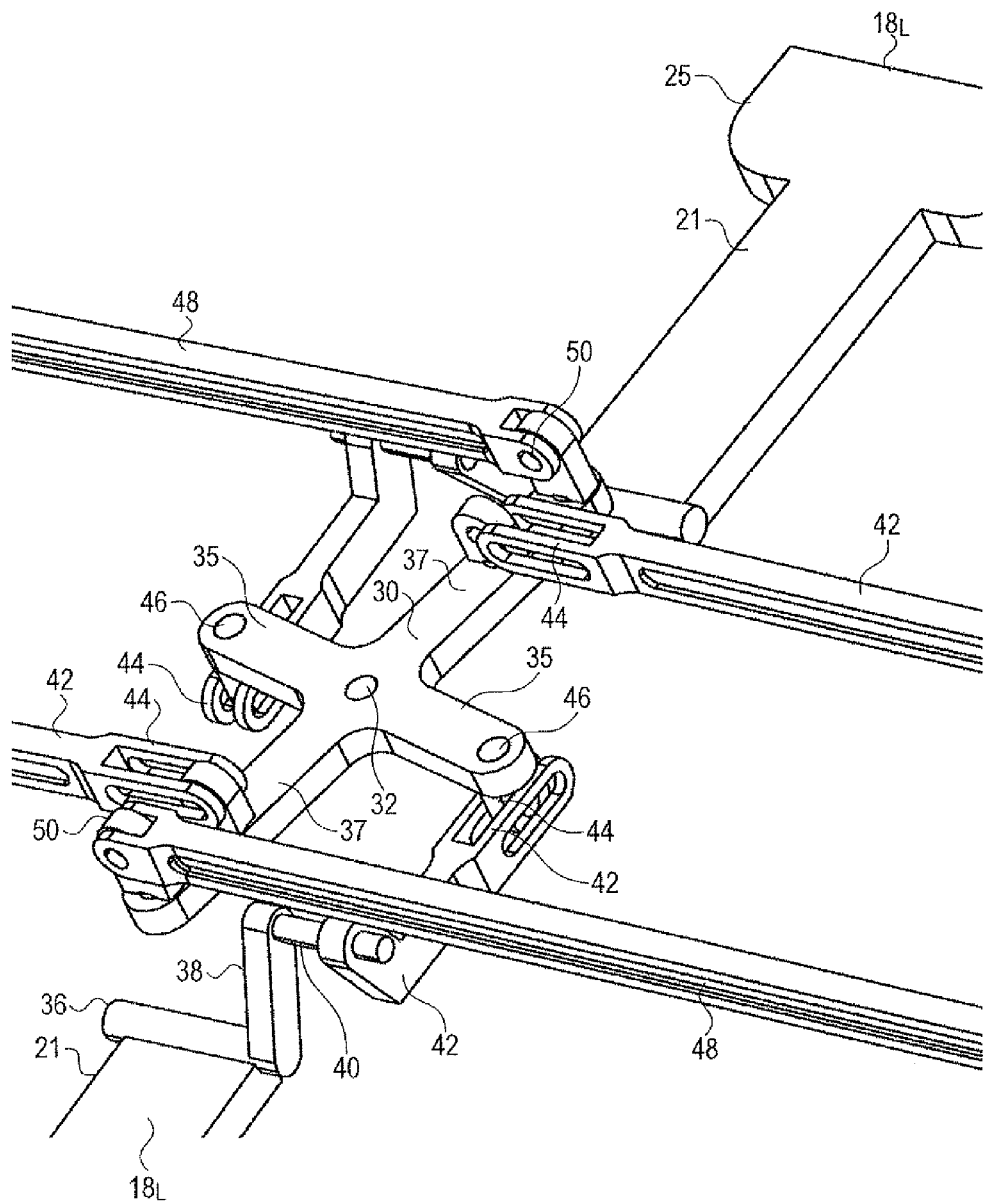
FIG. 5A is a perspective view of a portion of the skid displacement mechanism of FIG. 4.
Figure 5B:
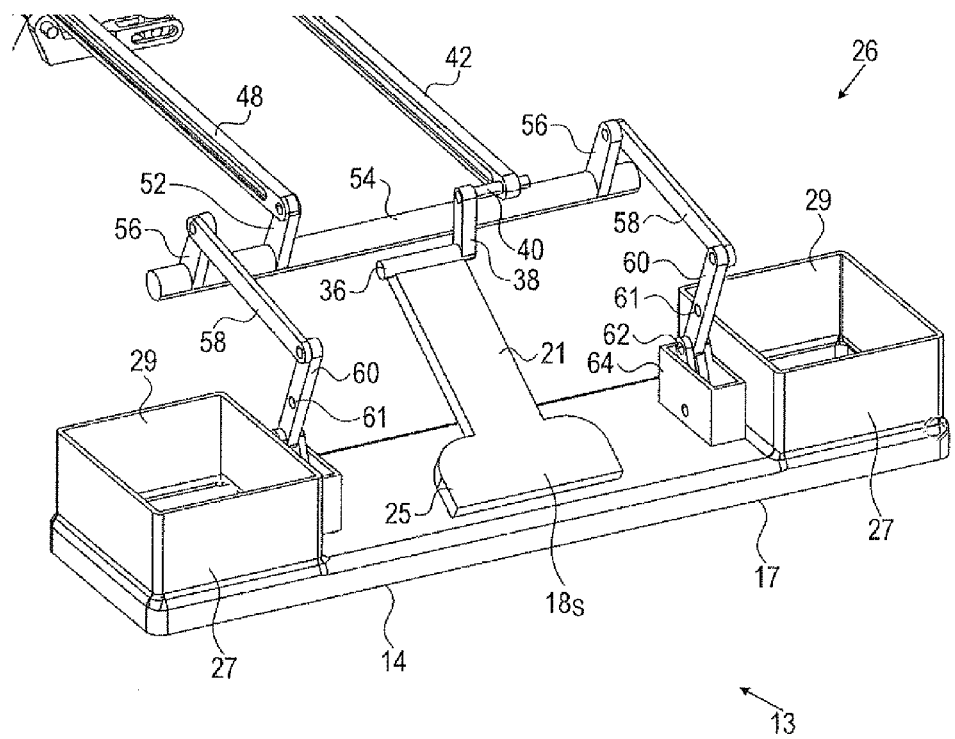
FIG. 5B is a perspective view of another portion of the skid displacement mechanism of FIG. 4.

FIG. 4 shows skid displacement mechanism 26 in greater detail, and FIGS. 5A and 5B show enlarged views of the components of skid displacement mechanism 26, for greater clarity.

As indicated, there are two short side pedals $18_S$, located on deck short side 13, and two long side pedals $18_L$ located on deck long side 15. Accordingly FIG. 4 illustrates the preferred embodiment of pallet-dolly 10, in which there are four pedals, one for each side.

In these figures it can also be seen that skids 14 have wheel openings 28 at opposing ends. Each wheel opening 28 is surrounded by an upwardly projecting wall 27 based at a top surface of skid 14, so as to form a hollow wheel chamber 29. The set of wheels 16, not shown in the figures, are fixedly attached to reinforcing beams 24 such that each wheel 16 is positioned inside one of the hollow wheel chambers 29. The wheels 16 are positioned substantially in the center of each chamber 29, so that they are free to rotate and/or swivel as appropriate.

Skid displacement mechanism 26 functions to move skids 14 between the skid lowered position and the skid raised position in response to depression of pedals 18 by the user. Accordingly, skid displacement mechanism 26 comprises the internal elements or mechanical components of device 10 that connect pedals 18 and skids 14.

Turning now to the elements of skid displacement mechanism 26 highlighted in FIG. 5A, it can be seen that there is a central element in the form of a cross 30, positioned substantially at a center of device 10. Central cross 30 is rotatable about an axis or center point 32, and has four arms 34 positioned perpendicular to one another. More particularly, as shown there are two in-line arms 35, and two in-line arms 37 perpendicular to arms 35. A spring and a latch (not shown in the figures) attach to at least one arm 34.

Central cross 30 has a first or neutral position, and a second or latched position in which cross 30 is rotated from the first position. In the latched position, the springs provide a bias urging cross 30 to return to the neutral position, but cross 30 is retained in the second position against the spring bias by the latch. Upon release of the latch, cross 30 rotates back to the neutral position.

Central cross 30 can have any orientation with respect to the sides of deck 12 when in the neutral position. According to some embodiments, cross 30 may be configured so that in the neutral position awls 34 line up with the sides of the deck, so that arms 37 are parallel to short sides 13, and arms 35 are parallel to long sides 15. This is the configuration of the neutral position of the embodiment shown in the figures, and in FIGS. 4-5 central cross 30 is shown rotated in an intermediate position between the neutral position and the latched position.

Cross 30 connects to pedals 18 through a series of elements that may be seen more clearly in FIG. 5A. As indicated, each pedal 18 has a wide flat part 25 to receive the user's foot. This part connects to an extended rectangular part 21 which joins a main hinge 36 of the pedal. When the user depresses wide flat part 25, pedal 18 accordingly rotates about an axis formed by main hinge 36. The hinge 36 is fixedly attached to an upward projecting pedal rod 38. A slide pin 40 is fixedly attached to an opposing end of pedal rod 38. Slide pin 40 is perpendicular to pedal rod 38 such that slide pin 40 is parallel to main hinge 36, and is also directed outwardly, away from main hinge 36 and its corresponding pedal 18.

Further, there is a pedal connecting rod 42 that connects each slide pin 40 to one of the arms 34 of rotatable element 30. At one end of pedal connecting rod 42 there is a circular aperture sized and shaped to form a slidable fit with slide pin 40. There may also be a roller bearing or similar element inside the aperture to facilitate the sliding movement between slide pin 40 and pedal connecting rod 42.

At the opposing end of pedal connecting rod 42 there is a displacement slot 44 that is sized and shaped to mate with a link pin 46 attached to the corresponding arm 34 of central cross 30. The elements are configured so that link pin 46 may slide or otherwise move substantially freely within displacement slot 44. As shown, all four link pins 46 are located at the same distance from the axis or center point 32 of rotatable element 30. As a result, each pedal 18 experiences the same moment and range of travel. It may also be noted that pedal connecting rods 42 connected to long side pedals $18_L$ are relatively short in length, while pedal connecting rods 42 connected to short side pedals $18_S$ are relatively long in length, as a result of the distance of each pedal from central cross 30 located at or about the center of pallet-dolly 10.

When pedal 18 is depressed, pedal 18 rotates about hinge 36 so that the connected elements 38, 40, and 42 move back, towards the pedal being pressed. Since pedal connecting rod 42 is connected to one of the arms 34 of cross 30, arm 34 also receives a pulling force, in the direction of the pedal, when the pedal is depressed. When cross 30 is in the neutral position, this pulling force causes cross 30 to rotate and move to the latched position, where it is retained by the latch against the bias of the springs that urge it to rotate in the reverse direction. When cross 30 is in the latched position and associated pedal 18 is depressed, the pulling force on arm 34 is the same as before. However, the effect of the pulling force when in the latched position is to release the latch, so that the springs become free to urge cross 30 to rotate in the reverse direction and return to the initial, neutral position.

It may be noted that as central cross 30 rotates in either direction, link pins 46 slide or move inside displacement slots 44 from one end of displacement slot 44 to the other, and pedal connecting rods 42 slide along slide pins 40. More particularly, as central cross 30 rotates, for example in the clockwise direction, link pins 46 move in an arcuate path that, in terms of directional vectors, is both towards the opposing side and also inward, towards the opposing pedal. The vectors are reversed, i.e. to produce outward movement, for rotation of cross 30 in the counter-clockwise direction. This inward and outward movement is accommodated through the slidable configuration of pedal connecting rod 42 relative to slide pin 40.

Further, while the pedal being pressed directly effects one associated pedal connecting rod 42 and its corresponding link pin 46, it may be noted the link pins 46 on the other three arms 34 of central cross 30 slide within their corresponding displacement slots 44. In this way, the other three pedals (or one pedal, for an embodiment with two pedals) do not need to move, and accordingly remain stationary, as central cross 30 rotates.

It may also be noted that the axis of rotation of each pedal 18 is that of main hinge 36, which is parallel to the side of device 10 on which the pedal is located. For example, pedals $18_S$ rotate about their associated hinges 36 parallel to short side 13, and pedals $18_L$ rotate about their associated hinges 36 parallel to long side 15.

Skid displacement mechanism 26 also contains two sliding actuators 48. These actuators are in the form of rods that connect at one end to opposing in-line arms 37 of cross 30, and at an opposite end to a group of elements, discussed in greater detail below, that collectively act to raise and lower skids 14 in the vertical plane. In this way, sliding actuators 48 may be viewed as a link that enables cross 30 to move skids 14. Alternatively, sliding actuators 48 may be viewed as horizontal actuators since they operate in the horizontal plane, and the group of elements that raise and lower skids 14 may be viewed as vertical actuators since they translate the horizontal motion of actuators 48 into vertical motion of skids 14.

Each sliding actuator 48 has hinge or pivot type joints at each end. As indicated, each actuator 48 attaches to arm 37 of cross 30 at a hinge bracket 50 mounted at an end of arm 37. It is to be appreciated that in-line arms 37 are slightly longer than in-line arms 35 in order to accommodate this attachment of sliding actuators 48.

Since sliding actuators 48 attach to aims 34 of cross 30, sliding actuators 48 will be displaced when cross 30 moves. More particularly, sliding actuators 48 will have a first position that corresponds to the neutral position of cross 30, and a second position that corresponds to the latched position of cross 30. Moreover, since sliding actuators 48 are attached to opposing sides 37 of rotating cross 30, when cross 30 rotates, sliding actuators 48 will move in opposite directions relative to one another, and in the same direction relative to cross 30. For example, when cross 30 rotates clockwise when moving from the neutral position to the latched position, each sliding actuator 48 will move inward, towards cross 30, and opposite to the other sliding actuator 48. Similarly, when cross 30 rotates counter-clockwise when moving back to the neutral position, each sliding actuator 48 will move outward, towards its respective short side 13, and away from central cross 30.

Turning now to the group of elements referred to above as vertical actuators, these may be seen in FIG. 4 and enlarged, for greater clarity, in FIG. 5B. As indicated, sliding actuators 48 connect or interface with these elements by attachment to an end of a second projecting rod 52, which is in turn fixedly attached to a rotating bar 54. There are two rotating bars 54, each located alongside one of the skids 14, and parallel to the skid and short side 13 of device 10. According to some embodiments, each rotating bar 54 is substantially the length of skid 14 between wheel chambers 29, such that the rotating bars 54 terminate across from a point on the skid approximately adjacent to wheel chamber 29. Two termination projecting rods 56 are fixedly attached to each rotating bar 54, one at each end of rotating bar 54.

Termination projecting rods 56 connect with skids 14 through three connecting links: a main link 58, a pivot link 60, and a skid attachment link 62, which together define a drive linkage for raising and lowering the skids, and provide over-center locking of the skids in the lowered (pallet) position. Main link 58 forms a hinged attachment to termination projecting rod 56 at one end and an end of pivot link 60 at an opposing end. Pivot link 60 in turn forms a hinged connection to skid attachment link 62 at an opposing end. The other end of skid attachment link 62 forms a hinged connection with skid 14 inside a connecting chamber 64, which is adjacent to wheel chamber 29. More particularly, the four elements comprising termination projecting rod 56 and links 58, 60, and 62, together form a mechanical linkage which transmits motion of skid 14, so that skid 14 moves vertically between the raised position and the lowered position. The mechanical linkage operates in a single plane perpendicular to skid 14.

Pivot link 60 includes a central aperture 61 that forms a fixed pivot point relative to the deck. Aperture 61 is positioned substantially in a center of link 60, between the opposing ends attached to main link 58 and skid attachment link 62, as described above. As a result of fixed pivot point 61 and as described further below, pivot link 60 and skid attachment link 62 are configured to move together, through their hinged connection, to form either a substantially straight connection in which skid 14 is lowered, or a buckled connection in which skid 14 is raised.

According to this configuration, it is to be appreciated that when rotating bars 54 and associated terminal projecting rods 56 are rotated towards their respective short sides 13, main link 58 will be pushed outward toward short side 13 and push the top of pivot link 60. Pivot link 60 will pivot inwardly about pivot point 61, so that the angle between pivot link 60 and skid attachment link 62 becomes small. Links 60 and 62 effectively buckle or collapse. As a result, skids 14 are raised so that skid bottom edges 17 are above wheel contact plane 19, and device 10 is a dolly.

Similarly, when elements 54 and 56 rotate in the reverse direction, towards cross 30, main link 58 also moves inward and pulls the top of pivot link 60. In this case, pivot link 60 pivots outwardly about pivot point 61, so that pivot link 60 and skid attachment link 62 form a substantially straight angle. This has the effect of lengthening the combined links 60 and 62. As a result, skids 14 are lowered so that skid bottom edges 17 are below wheels 16, and device 10 is a pallet.

According to some embodiments, links 60 and 62 are configured so that when they are locked in the above skid lowered or pallet position, their angle of connection is "past straight" or slightly more than 180 degrees. In this position the top of pivot link 60 will be tilted slightly towards the middle of pallet-dolly 10, and top of link 62 will be tilted slightly away from the middle of pallet-dolly 10. This will create in effect a "geometrical lock" of skid 14, so that it will be more difficult for the weight of the load to force the links back to the skid raised or dolly position.

As noted above, conversion from a pallet to a dolly often occurs when pallet-dolly 10 is under a heavy load. It is to be appreciated that pallet-dolly 10, according to some embodiments of the invention, performs this conversion by contracting skid displacement mechanism 26 through collapse or buckling of links 60 and 62. Further, it may be noted that the action of collapsing or buckling of links 60 and 62 is assisted by the weight of the load, since the force of the load acts downwards. Accordingly, unlike the fixed skid type of displacement mechanism, skid displacement mechanism 26 does not need to apply a large force to overcome the weight of the load.

The operation of skid displacement mechanism in translating depression of pedals 18 to raise and lower skids 14 will now be described. When central cross 30 is in the neutral position, sliding actuators 48 are in a first position positioned outward, closer to short sides 13. Terminal projecting rods 56, main links 58, and the top of pivot link 60 are also positioned outward. Pivot link 60 and skid attachment link. 62 form a buckled connection, skids 14 are in the raised position, and device 10 is a dolly.

Upon depression of any pedal 18, a pulling force towards the associated side of deck 12 is applied to the associated arm 34 of cross 30 by associated pedal connecting rod 42, and cross 30 rotates into the latched position. While springs urge cross 30 to rotate back, cross 30 is retained, by the latch. In making this shift in position, sliding actuators 48 move into their second position in which they are inward, closer to cross 30. As a result, terminal projecting rods 56, main links 58, and the top of pivot 60 are also positioned inward, i.e. towards cross 30 and away from their associated short sides 13. Pivot link 60 and skid attachment link 62 form a straight connection, skids 14 are moved to the lowered position, and device 10 is a pallet.

Upon subsequent depression of any pedal 18, a same pulling force is applied to associated arm 34 of cross 30 by associated pedal connecting rod 42, but this has the effect of releasing the latch. As a result, the springs urge cross 30 to rotate back to the neutral position. Sliding actuators 48 return to their first position in which they are pushed outward, and the associated vertical actuator elements return to the buckled position with skids 14 raised and device 10 set up as a dolly.

Figure 6A:
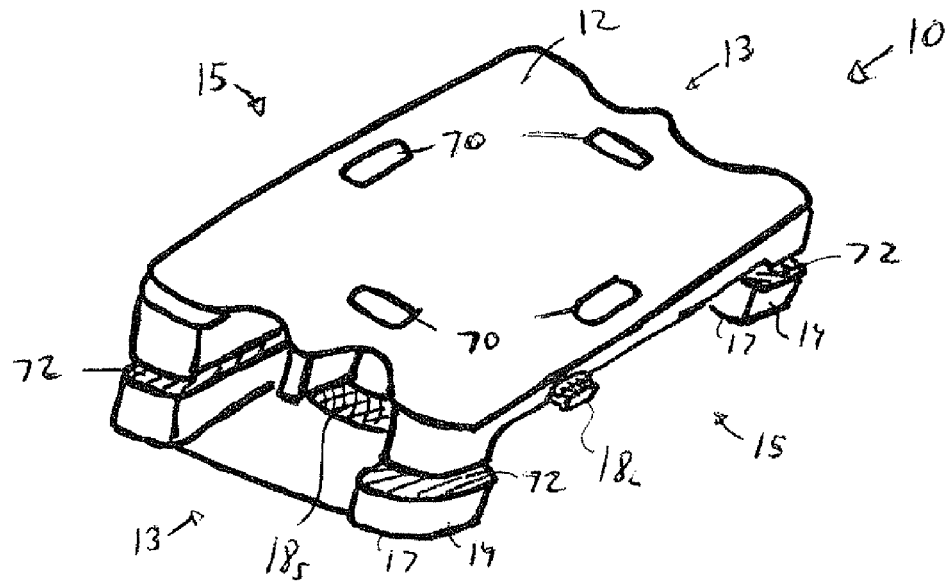
FIG. 6A is a perspective view of a pallet-dolly consistent with another embodiment of the present invention, where the pallet-dolly is configured as a pallet.
Figure 6B:
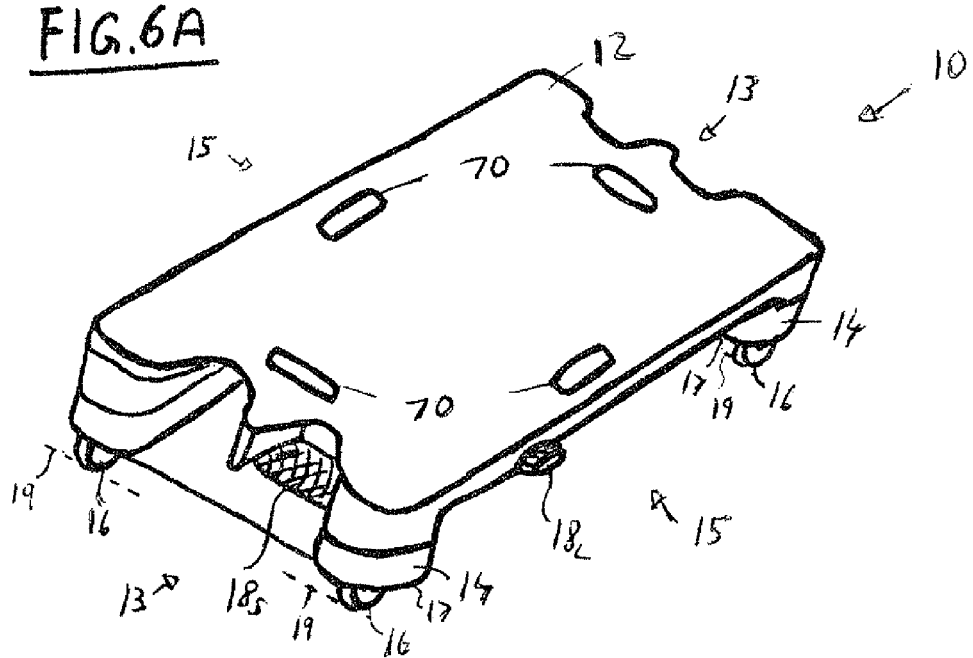
FIG. 6B is a perspective view of the pallet-dolly of FIG. 6A, where the pallet-dolly is configured as a dolly.
Figure 7:
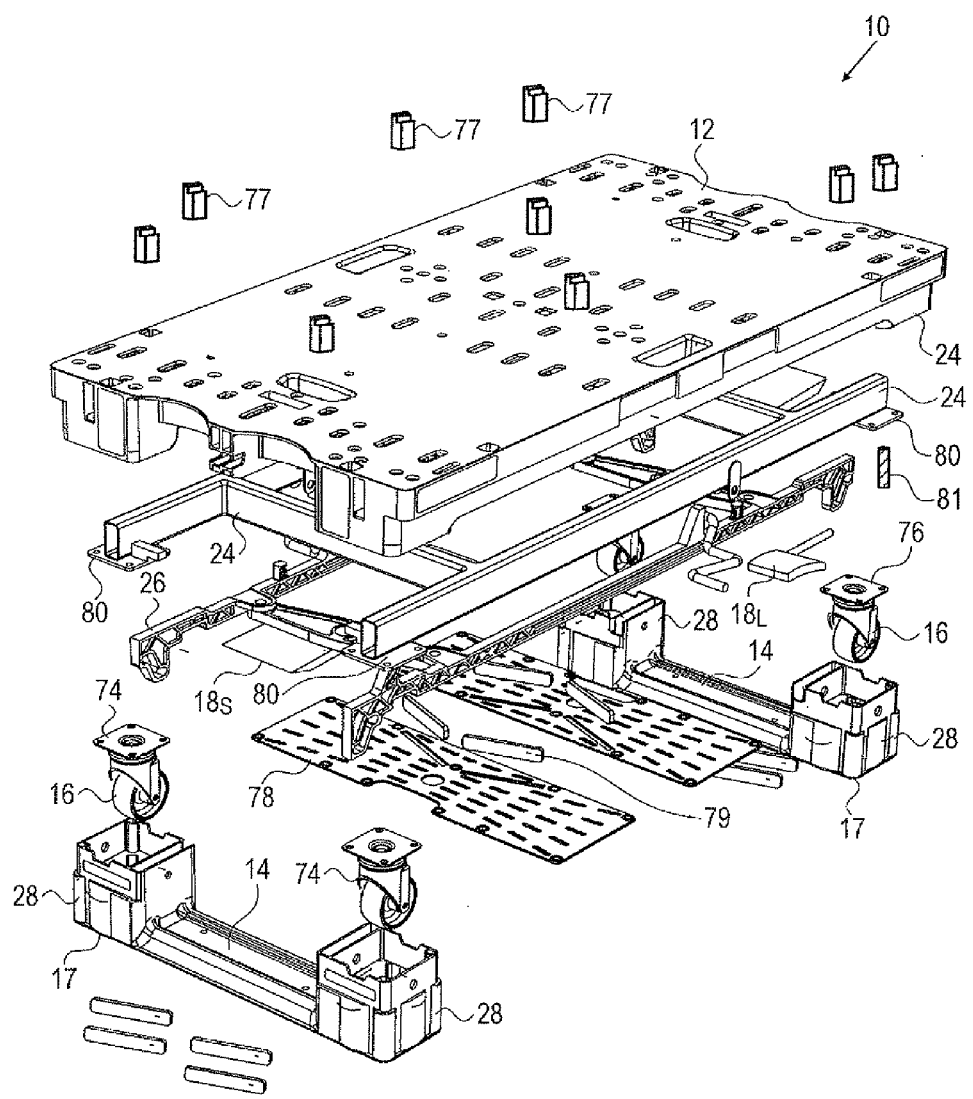
FIG. 7 is an exploded view of the pallet-dolly of FIGS. 6A and 6B.

FIGS. 6-8 show another embodiment of pallet-dolly 10 of the present invention. FIG. 6A shows pallet-dolly 10 as a pallet, in the skid lowered position, and FIG. 6B shows pallet-dolly 10 as a dolly, in the skid raised position with wheels 16 showing below skids 14. As with the previous embodiment, there are at least two pedals 18, a long side pedal $18_L$, and a short side pedal $18_S$, such that the two pedals 18 are located on adjacent sides of pallet dolly 10.

It may be noted that in the example of this embodiment as shown in FIGS. 6A-B, when facing long side pedal $18_L$, short side pedal $18_S$ is to the left of long side pedal $18_L$. In the example of the previous embodiment shown in FIGS. 1A-B, short side pedal $18_S$ was to the right of long side pedal $18_L$. It is to be appreciated that both examples are comprehended by the present invention, since in both cases there are at least two pedals located on adjacent sides of pallet-dolly 10.

It may also be noted that in this embodiment, the long side and short side pedals are not substantially the same in size and shape. More particularly, short side pedal $18_S$ is inset from the outer edge of short side 13 and is relatively broad and wide, while long side pedal $18_L$, by contrast protrudes slightly from long side 15, and is relatively small and narrow.

In the example of this embodiment, deck 12 is shown having a number of apertures 70. Apertures 70 may provide one or more functions such as enabling attachment of support straps to hold the load, providing a handle for carrying pallet-dolly 10, or even just reducing the weight of the device.

An exploded view of the elements of pallet-dolly 10 for this embodiment is shown in FIG. 7. As indicated, the elements include deck 12, reinforcing beams 24, skid displacement mechanism 26, wheels 16, fixed wheel frames 74, swivel wheel frames 76, and the set of skids 14. There are also included pop-ups 77, which fit into the surface of deck 12, mechanism cover 78, and antislip deck rubbers 79.

Reinforcing beams 24 attach in a fixed manner to an underside of deck 12. Skid displacement mechanism 26 and wheel frames 74 and 76 in turn are fixedly attached to an underside of reinforcing beams 24. It is to be appreciated that through the fixed attachment of the wheel frames to reinforcing beams 24 or deck 12, wheels 16 are at a fixed distance from deck 12. The set of skids 14 attach to skid displacement mechanism 26, as described in greater detail below.

The wheel frames in particular attach to corner plates 80 located at each of the four corners of reinforcing beams 24. It can be seen that fixed wheel frames 74 attach at four points, for example by four screws, to their corresponding corner plates 80. This provides a strong, fixed connection, which is appropriate since fixed orientation wheels do not rotate. Swivel wheel frames 76 attach by a single central connector 81 to their corresponding corner plates 80. This type of connection enables the use of caster wheels, which freely rotate about a vertical swivel axis. According to some embodiments, pallet-dolly 10 could be constructed with all four wheels of the same type, i.e. fixed orientation or swivel type. However, a configuration that uses both types, with a pair of fixed orientation wheels at one end and a pair of swivel type at the other end, is preferred, as this provides an adequate degree of both controllability and maneuverability.

As noted with respect to the previous embodiment, reinforcing beams 24 are optional, and when used provide rigidity and strength to pallet-dolly 10, so that the device is better able to support heavy loads. Reinforcing beams 24 also serve as a strong anchor point for attachment of wheels 16 and skids 14 through skid displacement mechanism 26.

In FIG. 7 it can be seen that pallet-dolly 10 has a fixed wheel configuration, as in the previous embodiment. More particularly, wheels 16 are supported by wheel frames 74 and 76 which have a fixed height, and which attach to optional reinforcing beams 24 or directly to the underside of deck 12.

FIG. 7 also shows skids 14 and wheels 16 similar to the previous embodiment. As indicated, skids 14 are in the foul' of functionally continuous planks extending the length of deck short side 13, with openings 28 and hollow wheel chambers 29 surrounding wheels 16. As a result of this structure, skids 14 are free to move vertically, i.e. to be raised or lowered, without interference with wheels 16. As noted, when skids 14 are in a lower position, skid bottom edges 17 are below wheel contact plane 19 and form the bottom surface of pallet dolly 10, so that pallet dolly 10 is a pallet. Conversely, when skids 14 are in an upper position, skid bottom edges 17 move above wheel contact plane 19, thereby exposing wheels 16 which form the bottom surface of pallet dolly 10, so that pallet dolly 10 is a dolly.

Skid displacement mechanism 26 for this embodiment is shown in greater detail in FIG. 8. As indicated, there are two front pedals $18_S$, located on deck short sides 13, and two side pedals $18_L$, located on deck long sides 15. FIG. 8 accordingly illustrates the preferred embodiment of pallet-dolly 10, in which there are four pedals, one for each side.

Skid displacement mechanism 26 includes two opposing sliding actuators 82, in the form of rods oriented parallel to one another, and to deck long side 15 in the example of FIG. 8. Sliding actuators 82 include various apertures and projections, and are accordingly preferably constructed from injection molded plastic. At the end of each sliding actuator 82 there is an aperture in the form of a bi-level displacement slot 84. Accordingly, there are four bi-level displacement slots 84, one located at each end of each sliding actuator 82. As shown, displacement slot 84 is a single continuous slot that may be divided into three parts: a lower slot 86, an upper slot 87, and an inclined slot 88 that connects lower slot 86 and upper slot 87. For greater clarity, the two bi-level displacement slots 84 in the foreground of the figure are designated as slots 84p and 84q, and are shown enlarged and encircled.

It can also be seen that the orientation of the component slots of displacement slot 84 on one sliding actuator 82 are opposite to the orientation of the component slots on displacement slot 84 in the opposing sliding actuator 82. For example, inclined slots 88 in slot 84q are oriented upwards to the right, whereas the corresponding inclined slots 88 in slot 84p are oriented upwards to the left. Similarly, upper slot 87 on displacement slot 84q extends to the right from the top of inclined slot 88, whereas upper slot 87 on displacement slot 84p, on the other sliding actuator 82, extends to the left from the top of inclined slot 88. Lower slots 86 similarly are oriented in opposite directions.

Skid displacement mechanism 26 also includes two rotatable cross connectors 90, a latch 92, and retractable springs 94. Front pedals $18_S$ attach to and rotate about axes 96, and also attach to a single neighboring actuator 82 through pedal pins 98.

A further element designated as skid pins 106 fixedly attach skids 14 to actuators 82. As shown, each skid pin 106 has two opposing ends. On end of skid pin 106 attaches to upwardly projecting wall 27 of skid 14, and the other end of skid pin 106 inserts and fits into displacement slot 84. For clarity, in FIG. 8 skid pins 106 are shown in two places: in position adjacent to displacement slot 84, and also as "106*x*" attached to skid 14 at upwardly projecting wall 27.

Side pedals 18$_L$, are mounted in triangular blocks 99 that are attached to deck 12. Side pedals rotate about fixed axis of rotation 100, which in turn attach to a single neighboring actuator 82 through connecting joint 101. This joint engages upward projecting step 103 on the top at about a middle position of sliding actuator 82, and acts to move sliding actuator 82 parallel to its length. Short side pedals 18$_S$ operate in a similar fashion, in that pedal pins 98 engage upward projecting steps 105 at the top near the ends of sliding actuators 82.

Each of the cross connectors 90 attaches to both sliding actuators 82. As shown, end points 102 on cross connectors 90 attach to corresponding connection points 104 on sliding actuators 82.

The rotatable cross connectors 90 have a neutral position and a latched position. In the neutral position cross connectors 90 are not subject to bias. Upon rotation to the latched position, springs 94 urge cross connectors 90 to return to the neutral position, but cross connectors 90 are retained in the latched position by latch 92. Upon release of latch 92, cross connectors 90 rotate back to the neutral position along the same path of rotation, but in the reverse direction.

The two sliding actuators 82 each attach to opposing arms of cross connectors 90. Accordingly, sliding actuators 82 are moved by cross connectors 90, and have a first position and second position corresponding to the neutral position and latched position of cross connectors 90. The two sliding actuators 82 move in opposite directions when viewed relative to each other, and in the same direction when viewed relative to cross connectors 90.

The operation of skid displacement mechanism 26 for this embodiment will now be described. Using the skid lowered position as a start or initial state, sliding actuators 82 are parallel to one another, and cross connectors 90 are in the neutral position. In this configuration, in the neutral position cross connectors 90 are parallel to deck short sides 13. Skid pins 106 are in lower slot 86, and skids 14 are at their lower position, so that pallet-dolly 10 is a pallet.

When either front pedal 18$_S$ is depressed by the user, both cross connectors 90 rotate as shown by curved arrows 110. Through connecting points 102 and 104, rotation of the cross connectors causes sliding actuators 82 to slide linearly in a direction parallel to their length, or to deck long side 15. The two sliding actuators 82 move in opposite directions from one another, as shown by arrows 112. Similarly, when either side pedal 18$_L$ is pressed down or stepped upon by the user, cross connectors 90 rotate and sliding actuators 82 slide linearly in the same manner and orientation as when front pedals 18$_S$ are activated.

Accordingly, pressing any of the four pedals on any side leads to the same result, a movement or shift of each sliding actuator 82 in the same specific direction indicated by arrows 112. It may also be noted that front pedals 18$_S$ rotate about axes 96 which are parallel to deck short sides 13, i.e. the same side on which the activating front pedals are located. By contrast, side pedals 18$_L$ rotate about axes 100 which are perpendicular to deck long sides 15, i.e. the same side on which the activating side pedals are located.

Upon movement of sliding actuators 82 in opposite directions, the shape formed by opposing sliding actuators 82 forms a parallelogram. More particularly, the movement of sliding actuators 82 causes bi-level displacement slots 84 to move in such a way that skid pins 106 slide from a position entirely within lower slot 86 to an opposite end at the lower base of inclined slot 88. Then, the weight of deck 12 urges deck 12 downwards, since it is no longer locked into position by the presence of skid pin 106 in lower slot 86. As deck 12 moves downward, skid pin 106 slides up inclined slot 88, and then sideways into a locked position in upper slot 87. The movement of skid pins 106 up inclined slot 88 is shown by arrows 114 in the enlarged views of displacement slots 84*p* and 84*q*. In this position skids 14 are raised so that skid bottom edges 17 are above wheel contact plane 19, and pallet dolly 10 is a dolly.

As noted, conversion of pallet-dolly 10 from a pallet to a dolly will frequently occur when device 10 is supporting a load. Accordingly, it is to be appreciated that the weight of the load will reinforce the downward movement of deck 12, and effectively facilitate the transition of pallet-dolly 10 from a pallet to a dolly. Skid displacement mechanism 26 accordingly has the benefit of changing the presence of a load from a burden to be overcome to an asset or aid in the conversion process.

While in the skid raised position, latch 92 triggers to hold cross connectors 90 in their rotated or non-neutral position, i.e., as set by movement in the direction of curved arrows 110. In this embodiment, as shown cross connectors 90 are not parallel to deck short sides 15 when in the latched position. As noted, in this position retractable springs 94 are extended and create a force or bias urging cross connectors 90 to return to their initial neutral position. This bias however is resisted by latch 92, and pallet-dolly 10 remains in the skid raised position.

When it is desired to return to the skid lowered position, the user depresses any pedal 18. This causes cross connectors 90 to jerk or move slightly in the direction shown by curved arrows 110. Latch 92 is configured to respond to this movement by releasing its hold of cross connectors 90. As a result, retractable springs 94 pull cross connectors 90 back to their initial position parallel to deck short sides 13. This movement of cross connectors 90 causes actuators 82 to move in a direction opposite to that shown by arrows 112, and back to their initial neutral position. The movement of sliding actuators 82 in turn causes skid pins 106 to slide out of upper slot 87 to a position at the top of inclined slot 88, where the force of the springs causes them to slide down inclined slot 88 and into a locked position in lower slot 86. The movement of skid pins 106 down inclined slot 88 is shown by arrows 116 in the enlarged views of displacement slots 84. If the deck is currently loaded, the force of the springs is typically insufficient to complete the conversion back to the fully locked pallet configuration, since this would involve slight lifting of the load. In such a case, the implementation illustrated here may provide a brake function due to the downward contact pressure of the skids against the ground. This option will be discussed further below in the context of the embodiment of FIGS. 9A-14B.

It is to be appreciated that skid displacement mechanism 26 in this embodiment functions similar to that of the previous embodiment. In both cases there is a central rotatable element having opposing anus, and two sliding actuators attached to the opposing arms. In this embodiment the rotatable element is cross connectors 90, which has two parts, but performs substantially the same as the single element cross 30 of the first embodiment. The rotatable element has a neutral and a latched position. Activation is by depression of any pedal 18, which applies a force to an arm of the rotatable element. Similarly, the two sliding actuators move between a first and second position, in correspondence with the neutral and latched position of the rotatable element. Vertical actuators, in this case in the form of displacement slot 84, are configured to translate the horizontal movement and position of sliding actuators 82 into vertical displacement of skids 14.

In both embodiments discussed thus far, the neutral and latched positions of the rotatable element correspond to the two skid positions, i.e. the skid lowered position and the skid raised position. Either skid position may correspond with either rotatable element position, according to the particular configuration of the skid displacement mechanism. It may be noted that in the first embodiment, the neutral position corresponds to the skid raised position (dolly) and the latched position corresponds to the skid lowered position (pallet), and in the second embodiment these relationships are reversed.

FIGS. 9-14 show another embodiment of pallet-dolly 10 of the present invention. FIG. 9A shows pallet-dolly 10 as a pallet, in the skid lowered position, and FIG. 9B shows pallet-dolly 10 as a dolly, in the skid raised position with wheels 16 showing below skids 14. As with the previous embodiment, there are at least two pedals 18, a long side pedal 18$_L$, and a short side pedal 18$_S$, such that the two pedals 18 are located on adjacent sides of pallet dolly 10. Pallet-dolly 10 in the example shown in FIGS. 9-14 has four pedals 18, one on each side of deck 12.

Figure 9A:
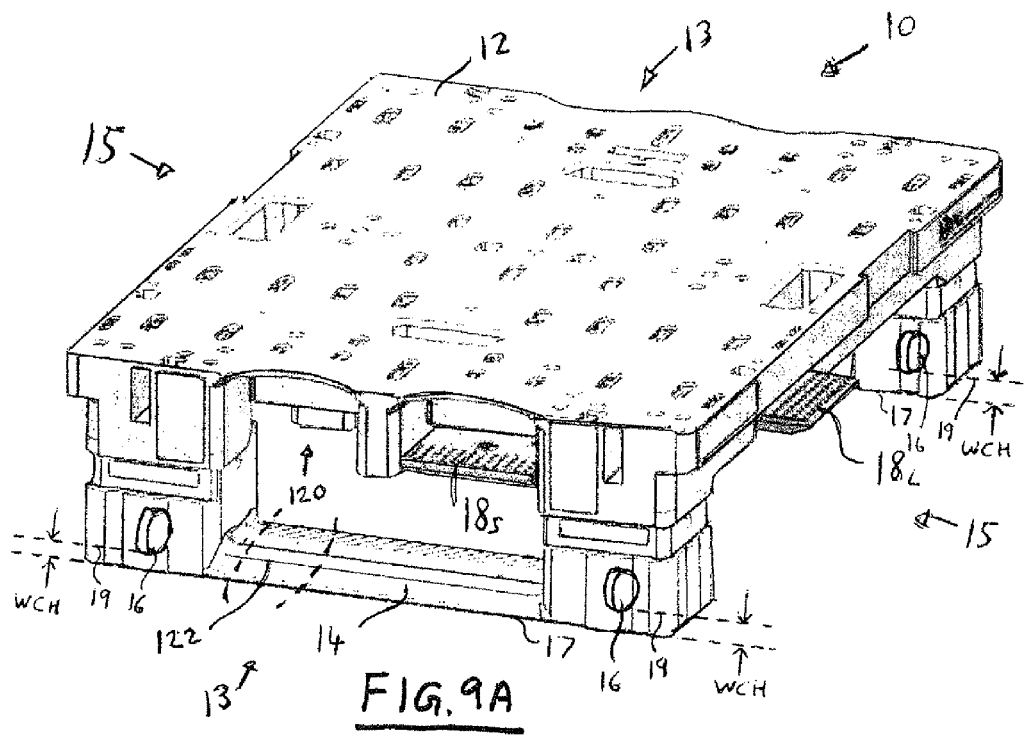
FIG. 9A is a perspective view of a pallet-dolly consistent with another embodiment of the present invention, where the pallet-dolly is configured as a pallet.
Figure 9B:
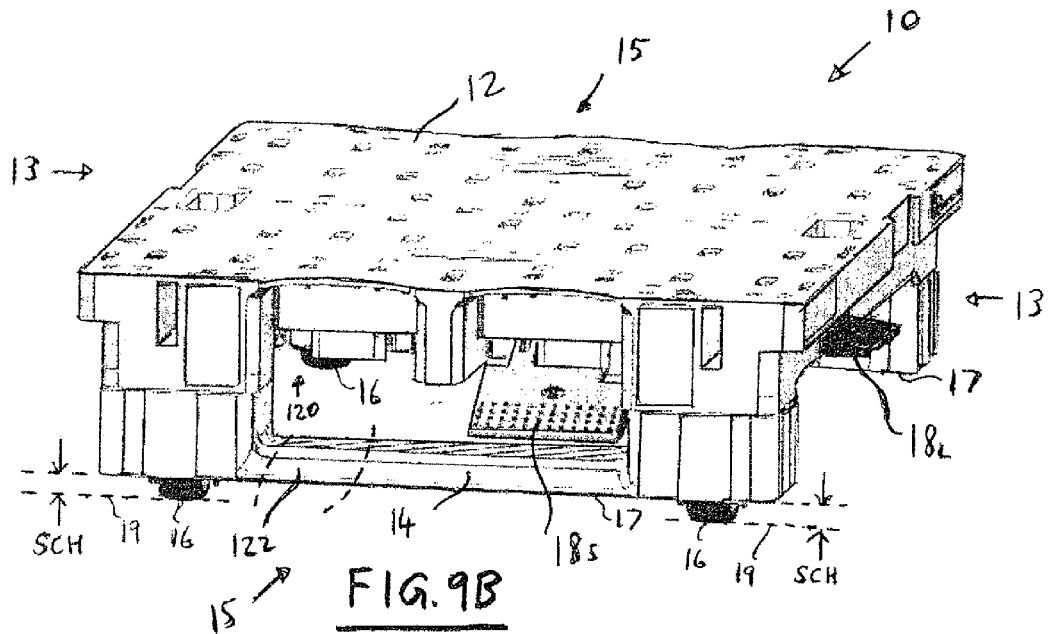
FIG. 9B is a perspective view of the pallet-dolly of FIG. 9A, where the pallet-dolly is configured as a dolly.

In this embodiment, depression of pedals 18 assists in converting pallet-dolly 10 from the pallet state to the dolly state, but is not effective to convert from the dolly state to the pallet state. Instead, according to certain particularly preferred embodiments of the present invention, pallet-dolly 10 is configured such that a user converts the pallet-dolly from the dolly state to the pallet state simply by pressing directly on skid 14. As shown in FIGS. 9A and 9B, adjacent to short side pedal 18$_S$ is an open space 120 above skid 14. Space 120 is empty in that it does not contain a pedal 18 or any other element. Accordingly, a user may insert a foot into this space and press down directly onto skid 14. A dashed area 122 is shown on skid 14 in FIGS. 9A and 9B to indicate the part of skid 14, directly below open space 120, that receives the user's foot.

A further feature of certain preferred embodiments of pallet-dolly 10 is that the depressable skid 14 also serves as a user operable brake, assuming a state in which it is biased downwards so as to press against the underlying surface when lowered to around wheel contact plane 19.

The above features of a preferred embodiment of pallet-dolly 10 may be clarified through review of a cycle of conversion between states as experienced by the user. Beginning with, pallet-dolly 10 as a pallet as shown in FIG. 9A, as noted skids 14 are in the skid lowered position. In order to convert the device from this state to a dolly, the user presses any pedal 18. When pedal 18 moves down, skids 14 move up, typically simultaneously, from the skid lowered position to the skid raised position, so that skid bottom edges 17 are above wheel contact plane 19, as shown in FIG. 9B.

In order to apply the brake and/or convert the device back to the pallet state, the user inserts his or her foot into open space 120 and presses down on skid 14. This action urges the skid to move from the skid raised position of FIG. 9B towards the skid lowered position of FIG. 9A. More particularly, pressing down on skid 14 moves the skid so that skid bottom edge 17 is in contact with the ground to provide a brake, but does not necessarily move wheels 16 off the ground, particularly if deck 12 is loaded.

While in the brake position, the user can convert the device back to a dolly at any time by pressing any pedal 18. Alternatively, from the brake position device 10 can be converted to a pallet by removing the load or by lifting device 10 clear of the ground, such as with a forklift. The latter action of lifting the pallet-dolly has the effect of relieving the weight of the load from the internal mechanism of device 10, and accordingly is functionally equivalent to removing the load. As a result of removal of the load, skid 14 moves beyond the brake position to reach its fully lowered and locked position as a pallet.

In the pallet state shown in FIG. 9A, wheels 16 are hidden behind skids 14 and are accordingly not visible. However in the figure, for illustration purposes, wheels 16 have been drawn in solid line to indicate their position relative to skids 14 and the ground.

As indicated in FIG. 9A, in the pallet state wheels 16 have a fixed clearance or height above the ground which may be designated as the "wheel clearance height", or "WCH". Wheel clearance height is the appropriate or minimum height, distance, or clearance which wheels 16 should be lifted above the ground when device 10 is in the pallet state to ensure that the only ground contact is by skid bottom edge 17. More particularly, when wheels 16 are at WCH above ground, there is substantially no risk that pallet device 10 will roll as it would when in the dolly state.

In the dolly state shown in FIG. 9B, both wheels 16 and skid bottom edges 17 are visible. As indicated, there is a height, distance, or clearance of skid bottom edges 17 above the ground when device 10 is in the dolly state which may be referred to as the "skid clearance height", or "SCH". Skid clearance height is the appropriate or minimum distance that skid bottom edges 17 should be lifted above ground when device 10 is in the dolly state, to reduce or minimize the risk of small obstacles interfering with the rolling movement of the device.

In general, SCH will be appreciably greater than WCH. The wheels 16 need to be at a minimum height only slightly higher than the ground to avoid the risk of enabling device 10 to roll, so WCH may be relatively small. Raising WCH above the minimum height does not provide any significant further advantage, since ground clearance has already been achieved. By contrast, skids 14 should be relatively high above the ground, since the higher they are the greater the number of obstacles that may be overcome while the device is being rolled as a dolly. According to some embodiments of the invention, WCH is at least 3 mm, and SCH is in the range of 15 to 30 mm, and preferably in the range of 20 to 27 mm. Other values of WCH and SCH clearly fall within the scope of the present invention.

It is to be appreciated, from review of FIGS. 9A and 9B, that when moving from, the pallet state to the dolly state, skids 14 need to move a distance of WCH plus SCH, i.e. moving WCH moves the skids so that their contact surfaces reach wheel contact plane 19, and then moving SCH moves the skids into the desired position above the ground. Similarly, when moving from the dolly state to the pallet state, skids 14 move the same total distance of WCH plus SCH. In this case, skids 14 first move SCH to draw even with the wheels in contact with the ground, and then move WCH to ensure that the wheels are lifted away from skid bottom edge 17.

It is also worth noting how the weight or force of deck 12 and any load, if present, are received by the elements in the different states. In the pallet state the weight of the load is entirely on skids 14. In converting from the pallet to the dolly, when the skids move the distance WCH, the load weight is effectively lowered and transferred onto wheels 16. Skids 14 then travel the remaining distance SCH without a load, and the weight in the dolly state is supported by wheels 16. When converting from dolly to pallet, skids 14 descend distance SCH to the ground unloaded. Upon reaching the ground, the skids are biased downwards to provide a braking contact or, if unloaded, complete their motion through distance WCH to reach the locked pallet state.

Figure 10:
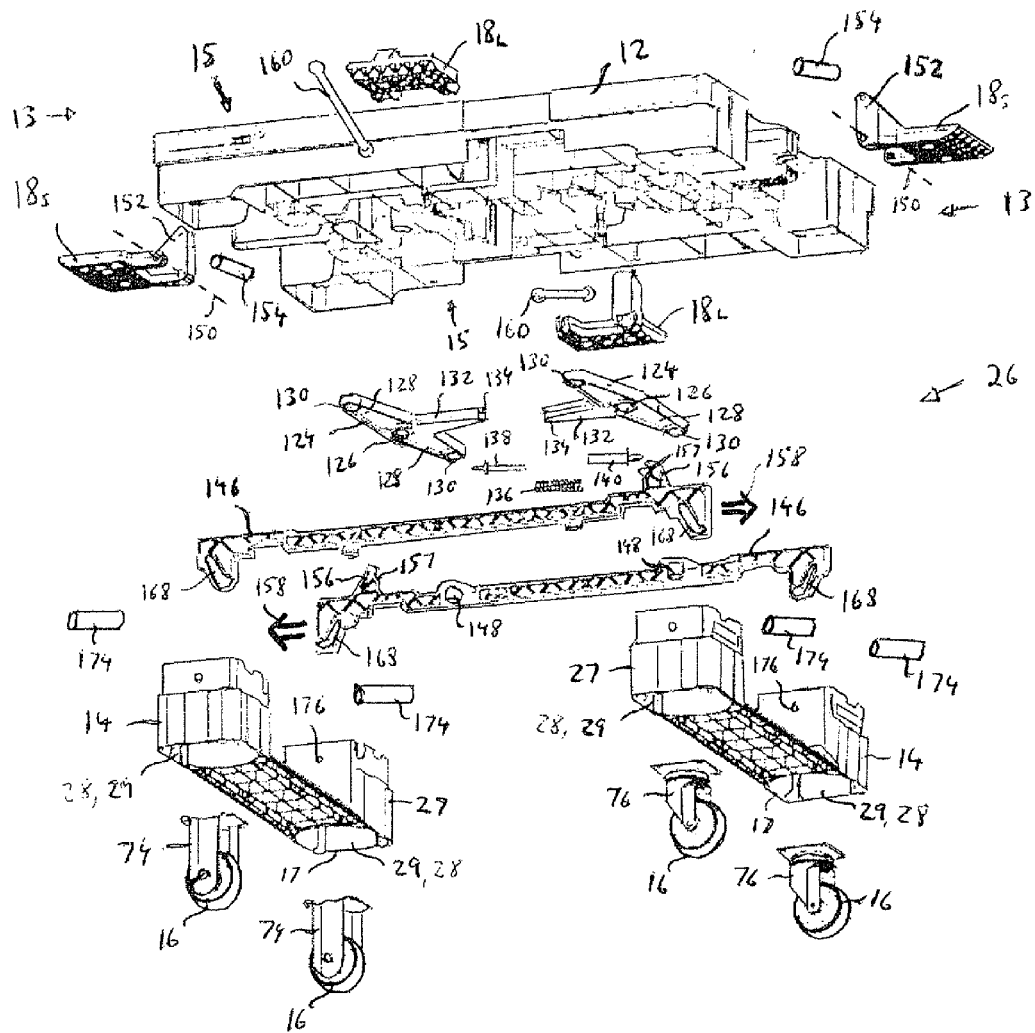
FIG. 10 is an exploded view of the elements of the pallet-dolly of FIGS. 9A-B.
Figure 11:
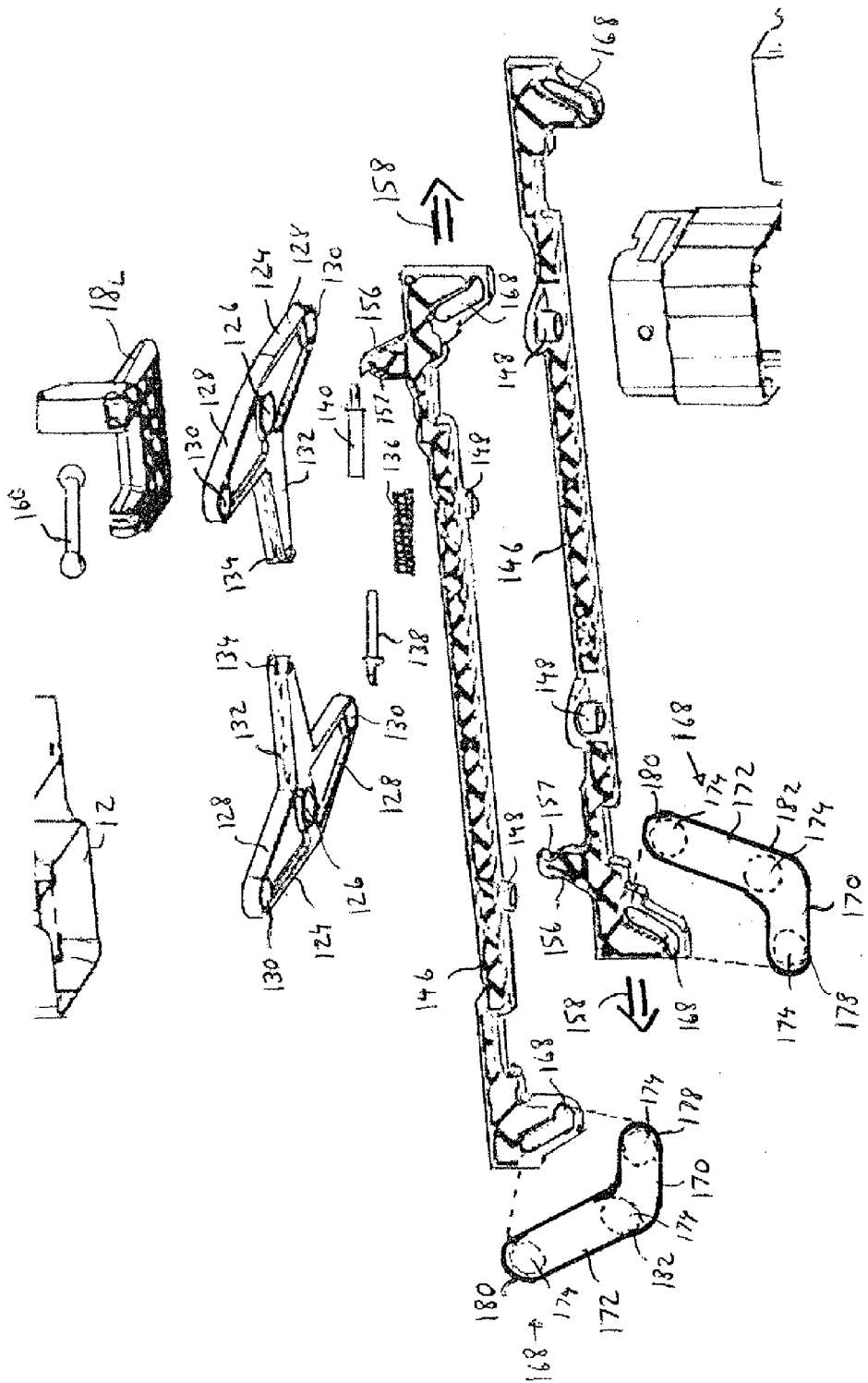
FIG. 11 is an enlarged view of some of the elements of the pallet-dolly shown in FIG. 10.

FIGS. 10 and 11 provide exploded views of the elements of pallet-dolly 10, and in particular show skid displacement mechanism 26 according to a preferred embodiment of the invention. FIG. 11 provides an enlarged view of some of the components of skid displacement mechanism 26 shown in FIG. 10, for enhanced clarity of detail.

As noted, skid displacement mechanism 26 functions to move skids 14 between the skid lowered position and the skid raised position in response to depression of foot pedal 18 and skid 14 by the user. Accordingly, skid displacement mechanism 26 comprises the internal elements or mechanical components of device 10 that are between and connect pedals 18 and skids 14.

As indicated in FIGS. 10 and 11, the non-limiting exemplary implementation of skid displacement mechanism 26 illustrated here includes a rotatable element in the form of two rotatable T-shaped cross connectors 124. The cross connectors 124 rotate about a pivot point 126, and have opposing arms 128 on either side of this point. The opposing arms 128 terminate in end points 130 that are in the form of apertures. The cross connectors 124 also have center projections 132 which project outwardly from about a center of the cross connectors, at central pivot point 126. Center projections 132 each terminate in a projection tip 134. The cross connectors 124 are positioned so that their respective center projections 132 face one another. Further, cross connectors 124 rotate together, so that their respective opposing arms 128 are always parallel to one another.

Skid displacement mechanism 26 further includes a biasing element or spring 136 connected between opposing projection tips 134. Except where otherwise indicated, in the embodiment shown in the figures spring 136 is a compression spring, and accordingly may also be designated as "compression spring 136" as appropriate.

Compression spring 136 is hollow, and contains in its core a telescopic rod comprising an inner core 138 and an outer core 140. The telescopic rod functions to provide a solid interior to compression spring 136 so that compression spring 136 does not collapse or bend when compressed. Inner core 138 fits inside outer core 140, and moves out and in to enable the telescopic rod to extend and contract in conjunction with extension and contraction of compression spring 136.

Figure 13A:
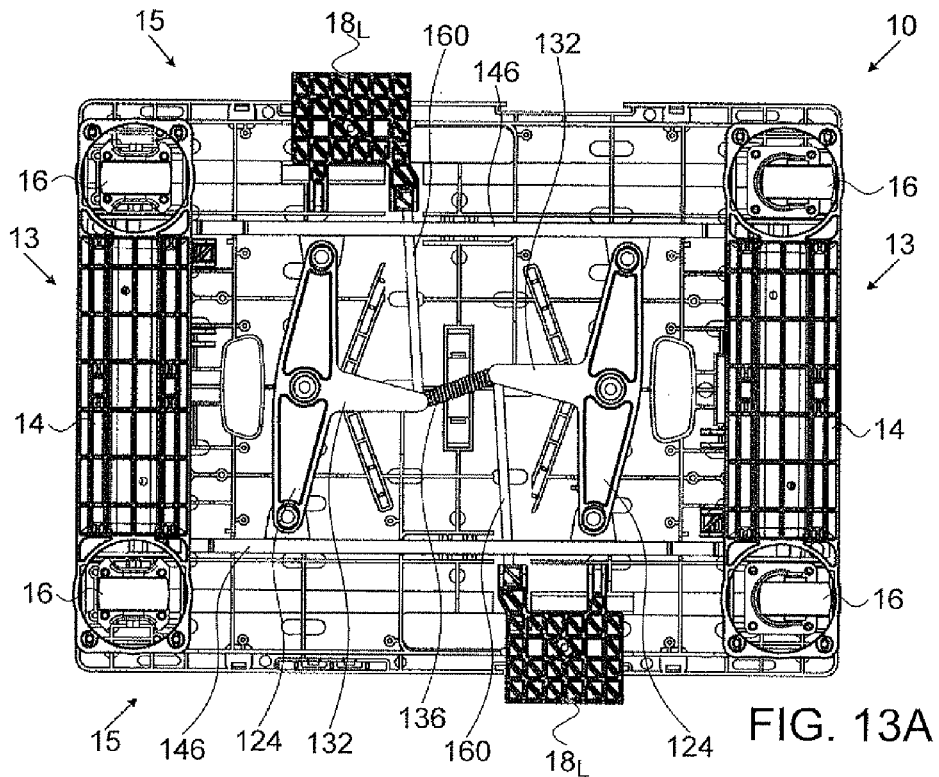
FIG. 13A is a bottom view of the pallet-dolly of FIG. 9A, where the pallet-dolly is configured as a pallet.
Figure 13B:
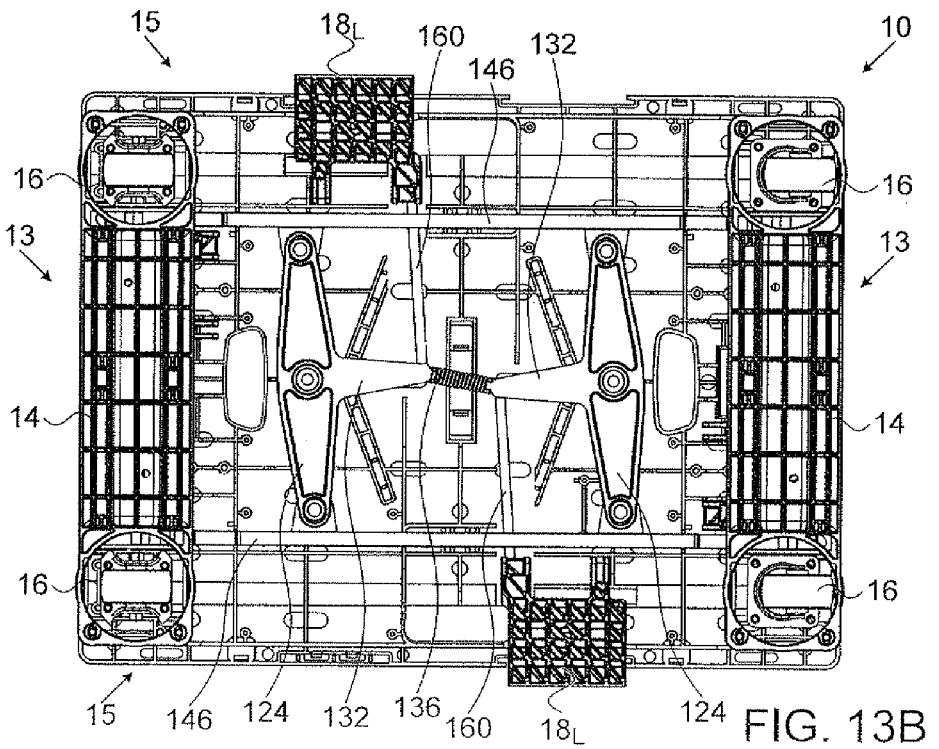
FIG. 13B is a bottom view of the pallet-dolly of FIG. 9B, where the pallet-dolly is configured as a dolly.

The cross connectors 124 rotate in an arc that is generally less than 90 degrees, and typically less than 30 degrees, and move between two stable positions under the force of compression spring 136. The movement of cross connectors 124 is shown in FIGS. 13A and 13B, which are isometric bottom views of pallet-dolly 10. In FIG. 13A cross connectors 124 are rotated slightly clockwise (when viewed from below), and are in a stable position corresponding to pallet-dolly 10 as a pallet. In FIG. 13B cross connectors 124 are rotated slightly counter-clockwise, and are in a stable position corresponding to pallet-dolly 10 as a dolly. Compression spring 136 pushes on projection tips 134 to provide a force that biases cross connectors 124 into one or other stable position. This force has to be overcome to move cross connectors 124 from one stable position to the other. Since there are two stable positions of cross connectors 124, these elements and more broadly, skid displacement mechanism 26, may be described as being a "bistable mechanism".

Figure 12A:
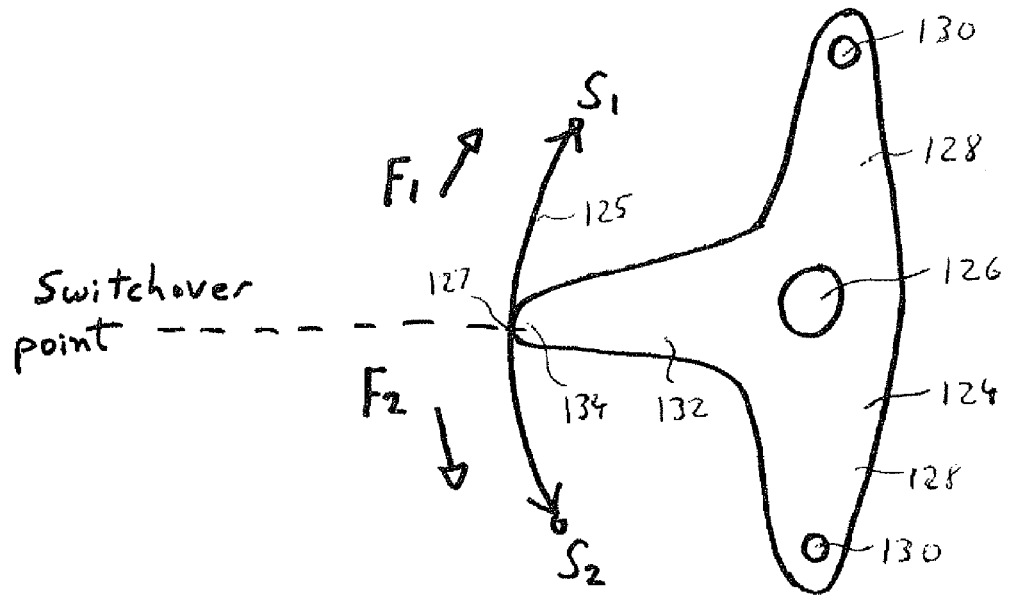
FIG. 12A is a schematic illustration of the operation of a cross connector element of the pallet-dolly shown in FIGS. 10 and 11.

The arrangement of cross connectors 124 and compression spring 136 to provide a bistable mechanism may be further understood from the sketch of FIG. 12A. As shown, cross connector 124 rotates about an arc 125 between two stable positions S1 and S2. At some point or position in the range of arc 125 there is a threshold, crossover, or switchover point or position 127. For further clarity, this crossover point is shown in FIG. 12A as a dashed horizontal line intersecting arc 125 at point 127 on the arc. When cross connector 124 rotates, for example clockwise, so that projection tip 134 is above switchover point 127, compression spring 136 (not shown in FIG. 12A) acts to provide a force shown as F1 that urges or pushes cross connector 124 to rotate towards stable position S1, or its maximum range in the clockwise direction. Similarly, if cross connector 124 is moved or rotated so that projection tip 134 is below switchover point 127, compression spring 136 provides the force F2, which urges or pushes cross connector 124 towards stable position S2, or its maximum range in the counter-clockwise direction.

Figure 12B:
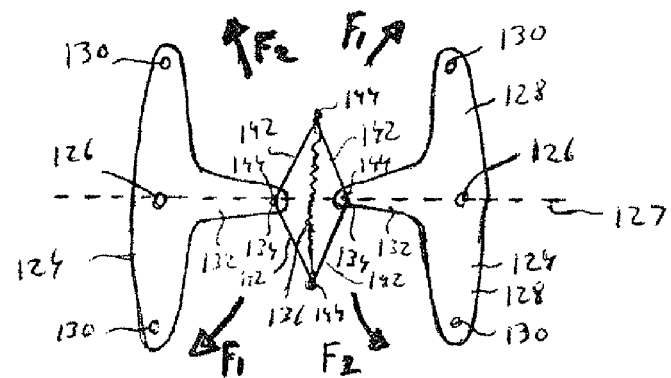
FIG. 12B is a schematic illustration of the operation of a cross connector element of the pallet-dolly using another embodiment of a spring.

FIG. 12B shows an alternative embodiment of skid displacement mechanism 26, in which spring 136 is a tension spring instead of a compression spring. For this embodiment, spring 136 may accordingly be designated as "tension spring 136".

As indicated, in this embodiment there are a set of four brackets 142 connected to one another at hinges 144 to form a parallelogram configuration, with spring 136 in the middle. Two of the hinges 144 are pivotally connected to the two projection tips 134 of cross connectors 124, with spring 136 attached to the other two hinges 144. Accordingly, in this embodiment spring 136 does not attach directly to projection tips 134 of cross connectors 124, as it did in the embodiment where spring 136 was a compression spring.

The natural bias of spring 136 when a tension spring is to contract from an extended or stretched state, in contrast to a compression spring whose corresponding tendency is to lengthen or expand from a shortened or contracted state. It may also be said that a tension spring is stable when contracted, and a compression spring is stable when expanded.

As indicated in FIG. 12B, cross connectors 124 and skid displacement mechanism 26 operate in a similar fashion when spring 136 is a tension spring as when spring 136 is a compression spring. When cross connectors 124 are rotated clockwise so that projection tips 134 are on alternate sides of switchover point 127, cross connectors 124 generate force F1 in the direction shown, towards each cross connector's respective stable position. Similarly, when cross connectors 124 are rotated counter-clockwise so that projection tips 134 cross to the opposite side of switchover point 127, cross connectors 124 generate forces F2 in the opposite direction. Since the compression spring embodiment is simpler, as it does not require the extra components of brackets 142 and hinges 144, it is generally preferred.

In the example of skid displacement mechanism 26 shown in the figures, the two cross connectors 124 are symmetrical in size and shape, and are also positioned symmetrically across from one another. As a result of this arrangement, switchover point 127 is substantially in the middle of arc 125, and the two forces F1 and F2 generated by compression spring 136 are substantially equal as well. According to some embodiments of the invention, cross connectors 124 may be configured to be asymmetrical in size, shape, and/or position, so that the switchover point would not be in the middle of arc 125 and the forces F1 and F2 would not be equal. A configuration of this type may provide some advantages in certain situations, as discussed in greater detail below.

Skid displacement mechanism 26 further includes two sliding actuators 146, with one located on either side of cross connectors 124. The sliding actuators 146 are oriented parallel to one another, and to deck long side 15. Sliding actuators 146 include various apertures and projections, and are accordingly preferably constructed from injection molded plastic.

Sliding actuators 146 are connected to cross connectors 124 through a downwardly projecting link pin 148 which fits inside and forms a pivotal connection with corresponding aperture end point 130 at the end of arm 128 of cross connector 124. The two sliding actuators 146 and two cross connectors 124 thus form a parallelogram frame such that displacement of one sliding actuator 146 results in an equal and opposite displacement of the other sliding actuator 146, and associated pivotal rotation of both cross connectors 124.

Sliding actuators 146 are also configured to be movable upon depression of pedals 18. As shown in FIG. 10. Each short side pedal 18s rotates about an axis 150 and has an upwardly projecting step 152 to which is attached a horizontally projecting pedal pin 154. The pedal pin 154 is sized and shaped to extend above adjacent sliding actuator 146 and to abut an upwardly projecting step 156 on sliding actuator 146. In this way, depression of pedal 18 causes pedal pin 154 to move back, towards the short side 13 in which the pedal is located. Pedal pin 154 pushes against a surface 157 of actuator upwardly projecting step 156, so that sliding actuator 146 also moves back towards short side 13, or in the direction shown by arrows 158. This motion is mirrored by the other sliding actuator 146, through corresponding motion of cross connectors 124.

It is to be appreciated that depression of short side pedals 18s causes actuator upwardly projecting steps 156 to move away from pedal pins 154. Accordingly, pressing on a pedal 18s does not affect any other pedal 18, or in particular the opposite short side pedal 18s. The other pedal 18s therefore remains horizontal while the pressed pedal 18s becomes inclined. There is also a spring, not shown, which returns the pressed pedal 18s to the horizontal position immediately after being pressed. There is no interference with this movement from upwardly projecting step 156 since, as noted, step 156 is now further away. A further result of this separation is that pressing any pedal 18s while pallet-dolly 10 is in the dolly state simply rotates pedal 18s about axis 150 but has no other material effect.

The manner in which long side pedals $18_L$ interact with cross connectors 124 may be seen in FIGS. 13A-B and 14A-B. The bottom views of FIGS. 13A-B show the position of cross connectors 124 and compression spring 136 when in the pallet and dolly states respectively. In these views it may be seen that long side pedals $18_L$ connect to cross connectors 124 through side pedal rods 160. In particular, side pedal rods 160 attach to projection tips 134 of cross connectors 124. Accordingly, depression of a long side pedal $18_L$ causes cross connector 124 to rotate in a counter-clockwise direction, when viewed from the perspective of a bottom view. It is to be appreciated that pedals 18 and their linkages to cross connectors 124 are configured so that pressing any pedal 18, whether on short side 13 or long side 15 of deck 12, will cause the same direction of rotation of cross connectors 124.

FIGS. 14A and 14B show further detail of the structure of long side pedals 18, for situations where pallet-dolly 10 is a pallet and a dolly, respectively. As indicated, each long side pedal 18 terminates in a linear displacement slot 162. A projecting pin 164 is fixedly attached to projection tip 134, and is slidably connected to linear displacement slot 162. There is also a spring (not shown), which restores long side pedals 18 to the horizontal position immediately after being pressed.

Turning to FIG. 14A, in the pallet state projecting pin 164 is positioned at a far end of linear displacement slot 162. Accordingly, when long side pedal 18 is pressed, side pedal rod 160 moves in the direction shown by arrow 166, and thereby pulls cross connector 124 so that it rotates counter-clockwise. As shown in FIG. 14B, this motion causes projecting pin 164 to move to the opposite or close end of linear displacement slot 162 when pallet-dolly 10 is in the dolly state.

It is to be appreciated that pressing long side pedal 18 does not cause movement of the opposing long side pedal 18. While the opposing cross connector 124 will rotate, that cross connector's associated projecting pin 164 will simply travel within linear displacement slot 162, from the far end to the close end. Accordingly, the opposing pedal's side pedal rod 160 will not be subject to any force and will not move. In addition, pressing long side pedal 18 while in the dolly state will just move side pedal rod 160 in the direction of arrow 166, or away from projecting pin 164. Since there is no contact with projecting pin 164, pressing pedal 18 has no material effect.

Turning now to sliding actuators 146, the sliding actuators move linearly, in a direction parallel to their length and to long side 15 of deck 12, and also move in a direction opposite to one another. As a result of their linked connection, the linear movement of sliding actuators 146 is always matched by rotational movement of cross connectors 124. Further, the rotational movement of cross connectors 124 in moving towards a stable position is matched with a corresponding linear movement of sliding actuators 146, either towards or away from short sides 13, as appropriate. Accordingly, sliding actuators 146 may be viewed as an element that functions to translate rotational movement of cross connectors 124 to linear movement.

The sliding actuators 146 are also connected to skids 14. This connection is preferably made by a pin-and-slot arrangement. Specifically, in the example illustrated here, apertures in the form of displacement slots 168 are located on the body of each sliding actuator 146. There are four displacement slots 168, one located at each end of each sliding actuator 146. As shown, displacement slot 168 is a single continuous slot that may be viewed as being composed of a lower slot 170 and an inclined slot 172. For greater clarity, in FIG. 11 two of the four displacement slots 168 are also shown in an enlarged view.

Skid displacement mechanism 26 further includes skid pins 174, which provide the link that connects skids 14 to sliding actuators 146. As shown, there are four skid pins 174. Skids 14 include skid links 176, in the form of apertures, which are each sized and shaped to receive a skid pin 174 fixed therein. Skid links 176 are shown positioned at an upper part of hollow wheel chamber 29, which as noted is attached to or an integral part of skid 14. Skid links 176 may be placed in other positions on skid 14, as appropriate for other embodiments of the invention. Displacement slots 168 are also sized and shaped to receive skid pins 174 in sliding engagement. Accordingly, skids 14 connect or attach to skid displacement mechanism 26 by connecting each skid pin 174 to skid link or aperture 176, and to the associated displacement slot 168. It is to be appreciated that, according to some embodiments, the positions of displacement slots 168 and skid links 176 may be reversed, so that displacement slots 168 are located on the sides of hollow wheel chambers 29 and skid links 176 are located on the bodies of sliding actuators 146.

Displacement slots 168 and skid pins 174 are configured so that skid pins 174 are readily slidable inside displacement slots 168. More particularly, skid pins 174 are movable between three positions in displacement slots 168. These three positions are illustrated in the enlarged views of displacement slots 168. As indicated, there is a first stable position 178, in which skid pin 174 is in lower slot 170, a second stable position 180, in which skid pin 174 is at the top of inclined slot 172, and an interim position 182, in which skid pin 174 is located near the bottom of inclined slot 172, at a position close to but just short of the vertex or intersection point of lower slot 170 and inclined slot 172. When skid pin 174 is in the first stable position 178, skids 14 are in the lowered position and pallet-dolly 10 is a pallet. When skid pin 174 is in the second stable position 180, skids 14 are in the raised position and pallet-dolly 10 is a dolly. When skid pin 174 is in interim position 182, skids 14 are in the lowered position and pallet-dolly 10 is a brake.

FIGS. 13A and 13B as noted show isometric bottom views of skid displacement mechanism 26 that illustrate the position of cross connectors 124 and compression spring 136 for the two stable positions. In FIG. 13A pallet-dolly 10 is a pallet, and skid pins 174 are in first stable position 178 in displacement slot 168. In FIG. 13B pallet-dolly 10 is a dolly, and skid pins 174 are in second stable position 180 in displacement slot 168.

It may be noted that the orientation of the component slots of displacement slot 168 in one sliding actuator 146 is opposite to the orientation of the component slots in displacement slot 168 in the opposing sliding actuator 146, since as noted above the sliding actuators are linked so as to move in opposite directions. For example, where inclined slot 172 in one sliding actuator 146 is sloped upwards to the right, inclined slot 172 in the opposing sliding actuator 146 will be sloped upwards to the left. Opposing lower slots 170 are similarly oriented in opposite directions, i.e. when one points to the right, with reference to its associated inclined slot 172, lower slot 170 in the opposing sliding actuator 146 will point to the left.

The effect of the pin-and-slot engagement is that horizontal sliding motion of sliding actuators 146 is translated into vertical movement of skid pin 174, and hence also of skids 14.

Cross connectors 124, sliding actuators 146, and skid pins 174 moving in displacement slots 168 form an integrated mechanical system in which motion of one element generates motion of the others, as follows. Rotation of cross connectors 124 under the force or urging of compression spring 136 moves sliding actuators 146 linearly in a horizontal plane, which in turn moves skid pins 174 and associated skids 14 vertically. Alternatively, movement of sliding actuators 146, such as for example by depression of pedal 18, will cause corresponding rotational movement of cross connectors 124 and vertical movement of skid pins 174. Lastly, independent movement of skid pins 174 in inclined slot 172, such as occurs when skid 14 is pressed downwards, will cause linear horizontal movement of actuator slots 146 and rotational movement of cross connectors 124. However, due to the horizontal orientation of lower slots 170, skids 14 are locked in the pallet position when fully lowered and when sliding actuators 146 are biased to the corresponding extreme position, requiring positive displacement of sliding actuators 146 by operation of pedal 18 before the skids can be raised.

It is to be appreciated that the range of motion of skids 14 in moving between the skid lowered position and the skid raised position corresponds to the range of motion of the component elements of skid displacement mechanism 26, i.e. the rotational movement of cross connectors 124 between stable positions S1 and S2, the linear movement of sliding actuators 146 between two extreme positions defined by forward and reverse movement along arrows 158, and the vertical movement of skid pins 174 in displacement slot 168.

In the embodiment shown, the range of motion limits are determined by the finite length of inclined slot 172 in displacement slot 168. It is to be appreciated that, according to some embodiments, the range of motion limits may alternatively be set by a physical block to rotation of cross connectors 124 and/or to linear movement of sliding actuators 146. In such embodiments, inclined slot 172 may be relatively longer and even could be open ended. Travel of skid pins 174 in such inclined slots would still be limited to positions 178, 180, and 182, if configured as such by appropriate placement of blocks to movement of cross connectors 124 or sliding actuators 146.

For greater clarity, the two stable positions, shown as S1 and S2 in FIG. 12A, refer to states in which skids 14 and associated elements of skid displacement mechanism 26 such as cross connectors 124, sliding actuators 146, and skid pins 174 in displacement slots 168, have reached their appropriate end or terminal points and are stable and stationary, i.e. are not moving. More particularly, the two stable positions of skids 14 are the skid lowered position and the skid raised position.

Skid displacement mechanism 26 may also be described as having two biased states, corresponding to the force or bias provided by compression spring 136 as a result of the positioning of center projections 132 of cross connectors 124 on either side of switchover point 127. On one side of switchover point 127 there is an bias urging skids 14 upwards, towards the stable dolly state, and on the other side of switchover point 127 there is a bias urging skids 14 downwards, towards the stable pallet state. Accordingly, while skid displacement mechanism is in a biased state, it may or may not have reached the corresponding stable state. More particularly, when skid displacement mechanism 26 is in the downward biased state, skids 1.4 may be in the non-stable brake state or in the stable pallet state.

Further, the bistable feature of skid displacement mechanism 26, according to some embodiments of the invention, relates not only to the presence of two stable positions, but more particularly to the fact that each stable position is produced by an active bias from a single biasing mechanism. This may be contrasted with the structure of other pallet-dollies, in which, for example, one of the pallet or dolly states may be produced by a biasing mechanism, such as a spring, but the other of the pallet or dolly states is the result of a latch holding or locking the skids and other elements in place against the bias of a spring or other biasing mechanism.

It is also to be appreciated that the terms "first" and "second", when used in reference to the two stable positions and their associated biased states, provide a convenient distinction in terminology and do not imply that either position or state occurs before or after the other. Accordingly, either of the two positions and their associated biased states may be referred to as "first", and the other of the two positions and states referred to as "second".

The operation of skid displacement mechanism 38, according to the preferred embodiment of the invention, will now be described.

In an initial position where pallet-dolly 10 is a pallet, skid pins 174 are in lower slot 170 and skids 14 are in the skid lowered position. As shown in the bottom view of FIG. 13A, cross connectors 124 are rotated slightly clockwise, and are pushed under the force of compression spring 136 into first stable position 178. In this fully lowered position of the skids, wheels 16 are raised a distance WCH above the ground, and the full weight of the load is taken by skids 14. Since skid pins 174 are in lower slot 170 which has an upper and lower boundary, the rotational force provided by cross connectors 124 does not need to oppose the load while maintaining this position.

When it is desired to convert pallet-dolly 10 to a dolly, the user presses down on any pedal 18. As noted, depression of pedal 18 moves sliding actuators 146 linearly and in a horizontal plane, towards short side 13 of deck 12. This direction of movement is shown in FIGS. 10 and 11 by arrows 158 for each sliding actuator 146. Movement of sliding actuators 146 will have two effects.

Firstly, sliding actuators 146 move so that skid pin 174 moves along lower slot 170 until it enters inclined slot 172 and starts to lift skids 14 towards deck 12. The weight of deck 12 and any load that may be on the deck assists with the initial part of this motion, i.e., the upward movement of skid pin 174 in inclined slot 172, as the load is lowered onto wheels 16.

The movement of sliding actuators 146 also causes cross connectors 124 to rotate, as described above. More particularly, the force of pedal 18 is sufficient to overcome the force of compression spring 136 holding cross connectors 124 in first stable position 178. Cross connectors 124 accordingly rotate past switchover point 127, and as a result come under the influence of compression spring 136 to produce a force in the opposite direction, towards second stable position 180.

Turning back to movement of sliding actuators 146, when sliding actuators 146 fall by a distance of WCH or wheel clearance height, wheels 16 will contact the ground and the weight of the load will be supported by the wheels. Skid pins 174 will continue to move upwards in inclined slot 172 under the influence of the force produced by cross connectors 124 directed towards second stable position 180. Skid pins 174 will move by the distance SCH or skid clearance height, until skid pins 174 reach second stable position 180 at the top of inclined slot 172. Skids 14 rise with skid pins 174, and in this position pallet-dolly 10 is a dolly. Since there is no longer any weight of the load on skids 14 (after initial movement WCH), the force provided by compression spring 136 only has to move skids 14. Compression spring 136 is selected to have sufficient spring force to move skid pins 174 and skids 14, and to hold skid pins 174 in second stable position 180.

When it is desired to convert pallet-dolly 10 from a dolly to a configuration in which the skids are lowered, such as a pallet or a brake, the user presses down on skid 14. This action physically forces skid pins 174 down inclined slot 172 to interim position 182 located slightly above the junction of inclined slot 172 and lower slot 170. More particularly, skid pins 174 and skids 14 are moved the distance of skid clearance height ("SCH") so that skid bottom edge 17 moves into contact with the ground.

At the same time, the movement of skid pins 174 in inclined slot 172 forces sliding actuators 146 to move linearly, in the opposite direction of that shown by arrows 158 in FIGS. 10 and 11. This movement in turn urges cross connectors 124 to rotate away from second stable position 180. This force is sufficiently strong to overcome the existing force of compression spring 136, so that cross connector 124 rotates past the switchover point. As a result, compression spring 136 now provides a force urging cross connectors 124 towards first stable position 178. It is to be appreciated that the bistable skid displacement mechanism 26 is mechanically linked to skids 14 such that switching from both the pallet to the dolly state, and from the dolly state to the pallet state, occurs as skids 14 pass through threshold position or switchover point 127.

What happens next depends on whether there is a load on deck 12. If there is no load, the force of compression spring 136 will be sufficiently strong to move cross connectors 124 so that they reach the end of their range of movement, at first stable position 178. This in turn will move sliding actuators 146 to the end of their range of linear movement, and skid pins 174 will reach the bottom of inclined slot 172, and then be urged into lower slot 170. In effect, compression spring 136 will have moved skids 14 the last part of their movement, a distance of wheel clearance height ("WCH"). Wheels 16 will be raised off the ground by the distance WCH, and pallet-dolly 10 will be a pallet.

Alternately, if there is a load on deck 12, compression spring 136 would have to be strong enough to move not only wheels 16 and deck 12 by the distance WCH, but also the load. This is unlikely to be possible in most cases, since compression spring 136 is typically configured to be strong enough to move an unloaded deck but not one with a load. Further, in many practical applications the loads are quite heavy, upwards of several hundred pounds in weight. As a result, cross connectors 124 will provide a force urging sliding actuators 146, which in turn urge skids 14 downward. The force will not be enough to move skids 14 downward the required distance WCH, but will be useful to contribute to the skids function as a brake, restraining rolling movement of wheels 16. Accordingly, in this position wheels 16 and skid bottom edge 17 are both on the ground, and movement of wheels 16 is stopped or reduced by the braking force of skids 14. The weight of the load is supported by wheels 16.

From this position, pallet-dolly 10 can be restored to a dolly by pressing any pedal 18. Otherwise, pallet-dolly 10 will be converted to a pallet upon direct removal of the load from deck 12, or by its functional equivalent of lifting pallet-dolly 10 with a forklift. Upon removal of the load the force provided by cross connectors 124 no longer has to lift the load, and is now sufficient to move the wheels 16 and empty deck 12 by the distance WCH.

In order to provide a strong brake while in the brake position, skid displacement mechanism 26 is preferably configured to provide a strong force by cross connectors 124 while in the brake position. There are a variety of ways that a stronger force may be achieved. One way is to simply increase the spring force of compression spring 136. A drawback to this approach however is that it would make pressing pedal 18 or skid 14 progressively harder. Another approach is to modify the design of cross connectors 124 so that they are asymmetrical in shape and/or position, so that the force in first stable position 178 is stronger than the force in second stable position 180. As noted, in second stable position 180 the force of cross connectors 124 only needs to support the weight of skids 14, which is a known weight and not too heavy. Yet another approach to increasing the force is to change the angle between lower slot 170 and inclined slot 172 in displacement slot 168. In brief, the leverage exerted by the force of sliding actuators 146 increases as the angle becomes shallower.

Pallet-dolly 10, according to some embodiments of the invention, provides several benefits to users of convertible movable platforms.

The pallet-dolly provides a user with access to conversion from a pallet to a dolly while positioned on at least two adjacent sides of the device, and in some embodiments from all sides of the device. This allows the user to store items using platforms configured as pallets, in whatever arrangement is most convenient or efficient. When the items need to be removed, a user can convert the device to a dolly if desired.

The pedal mechanism is relatively simple, and uses compact, low cost parts that occupy minimal space. There are no complicated gears, or costly and complicated motors as operation is entirely manual. Also, movement of the skids between positions is simply up and down, with no need for arcuate movement to allow for wheel swivel.

From the user's point of view, pallet-dolly 10 is simple and easy to use. All that is required is a single depression or press of the user's foot to convert from one state to the other. Neither external tools, such as a hammer, or multiple movements, such as might be required to rotate a shaft multiple times, are needed.

Accordingly, almost no active thinking on the part of the user is required. For administrators of shipping locations, where employee turnover may be high, this may reduce any overhead involved in training new users.

Further, as noted, since pallet-dolly 10 maintains the wheels at a fixed height and displaces the skids, the weight of a load not only does not hinder or oppose the conversion of the device from a pallet to a dolly, but actually assists in the conversion.

Although selected embodiment(s) of the present invention has/have been shown and described, it is to be understood that the present invention is not limited to the described embodiment(s). Instead, it is to be appreciated that changes may be made to this/these embodiment(s) without departing from the principles and spirit of the invention, the scope of which is defined by the claims and the equivalents thereof.

The invention claimed is:

1. A pallet-dolly device convertible between a pallet and a dolly, the device comprising:
    a deck having a generally rectangular shape with four sides, and a load supporting surface;
    a set of dolly wheels, attached at a fixed height below an underside of the deck so as to define a wheel contact plane;
    a set of movable pallet skids, each pallet skid having a ground contacting surface;
    a skid displacement mechanism, mechanically linked to the deck and the pallet skids, configured to move the pallet skids between a skid lowered position in which the skid ground contacting surface is lowered below the wheel contact plane to provide a pallet state of the pallet-dolly device, and a skid raised position in which the skid ground contacting surface is raised above the wheel contact plane to provide a dolly state of the pallet-dolly device; and
    at least two pedals associated with the skid displacement mechanism and deployed to be operated by a user to activate the skid displacement mechanism, a first of said pedals being disposed on a first side of the deck and a second of said pedals being disposed on a second side of the deck, said second side of the deck being adjacent to the first side of the deck.

2. The pallet-dolly device according to claim 1, further comprising a third pedal disposed on a third side of the deck and a fourth pedal disposed on a fourth side of the deck.

3. The pallet-dolly device according to claim 1, wherein activation of any one of said pedals moves the skids in at least one direction between the skid lowered position and the skid raised position.

4. The pallet-dolly device according to claim 1, further including reinforcing bars attached to the underside of the deck, wherein the set of dolly wheels and the skid displacement mechanism attach to the reinforcing bars.

5. The pallet-dolly device according to claim 1, wherein each pedal is movable about an axis parallel to the side of the device on which the pedal is disposed.

6. The pallet-dolly device according to claim 1, wherein the four sides of the deck comprise two long sides and two short sides, and wherein a pedal disposed on a short side of the deck is movable about an axis parallel to the short side, and a pedal disposed on a long side of the deck is movable about an axis perpendicular to the long side of the deck.

7. The pallet-dolly device according to claim 1, wherein the skid displacement mechanism includes:
    (a) a rotatable element having a neutral position and a latched position,
    (b) a biasing arrangement biasing the rotatable element from the latched position to the neutral position, and
    (c) a latch mechanism deployed to selectively retain the rotatable element in the latched position.

8. The pallet-dolly device according to claim 7, wherein the skid displacement mechanism is configured to move the rotatable element from the neutral position to the latched position upon depression of any one of the pedals.

9. The pallet-dolly device according to claim 1, wherein the skid displacement mechanism includes:
    (a) two sliding actuators, and
    (b) at least one rotatable element pivotally interconnecting with said sliding actuators and pivotally mounted relative to said deck such that said sliding actuators move equally in opposite directions,
    wherein the sliding actuators are interlinked with said skids such that rotation of said at least one rotatable element displaces said skids between said skid lowered position and said skid raised position.

10. The pallet-dolly device according to claim 9, wherein interlinking between said sliding actuators and said skids is provided by a set of pivotally interconnected links forming an over-center linkage deployed to provide locking of said linkage in said skid lowered position.

11. The pallet-dolly device according to claim 9, wherein interlinking between said sliding actuators and said skids is provided by engagement of a pin within a drive slot including an inclined portion for raising and lowering the skids and a horizontal portion defining a locked skid lowered position.

12. The pallet-dolly device according to claim 1, wherein the skid displacement mechanism is a bistable skid displacement mechanism,
    said bistable skid displacement mechanism being configured to assume a first state biasing the pallet skids upwards towards the skid raised position, and
    said bistable skid displacement mechanism being further configured to assume a second state in which said bistable skid displacement mechanism biases the pallet skids downwards towards the skid lowered position.

13. A pallet-dolly device convertible between a pallet and a dolly, the device comprising:
    a deck having a generally rectangular shape with four sides, and a load supporting surface;
    a set of dolly wheels, attached at a fixed height below an underside of the deck so as to define a wheel contact plane;
    a set of movable pallet skids, each pallet skid having a ground contacting surface;
    a skid displacement mechanism, mechanically linked to the deck and the pallet skids, configured to move the pallet skids between a skid lowered position in which the skid ground contacting surface is lowered below the wheel contact plane to provide a pallet state of the pallet-dolly device, and a skid raised position in which the skid ground contacting surface is raised above the wheel contact plane to provide a dolly state of the pallet-dolly device; and
    at least two pedals associated with the skid displacement mechanism and deployed to be operated by a user to activate the skid displacement mechanism, a first of said pedals being accessible from a first side of the deck and a second of said pedals being accessible from a second side of the deck adjacent to the first side of the deck, wherein each pedal is movable about an axis parallel to the side of the device from which the pedal is accessible.

* * * * *